(12) United States Patent
Lee et al.

(10) Patent No.: US 11,719,930 B2
(45) Date of Patent: Aug. 8, 2023

(54) METHOD AND APPARATUS WITH CROSSTALK CORRECTION

(71) Applicant: SAMSUNG ELECTRONICS CO., LTD., Suwon-si (KR)

(72) Inventors: Heesae Lee, Ansan-si (KR); Junhwan Lee, Namyangju-si (KR); Inwoo Ha, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 286 days.

(21) Appl. No.: 17/225,339

(22) Filed: Apr. 8, 2021

(65) Prior Publication Data

US 2022/0075183 A1  Mar. 10, 2022

(30) Foreign Application Priority Data

Sep. 7, 2020 (KR) .................. 10-2020-0114028
Dec. 23, 2020 (KR) .................. 10-2020-0181939

(51) Int. Cl.
*G02B 27/00* (2006.01)
*G06F 3/01* (2006.01)
*G06T 19/00* (2011.01)
*H04N 13/125* (2018.01)

(52) U.S. Cl.
CPC ..... *G02B 27/0075* (2013.01); *G02B 27/0025* (2013.01); *G02B 27/0093* (2013.01); *G06F 3/013* (2013.01); *G06T 19/006* (2013.01); *H04N 13/125* (2018.05); *B60K 2370/1529* (2019.05); *B60K 2370/177* (2019.05); *B60K 2370/785* (2019.05)

(58) Field of Classification Search
CPC ............... H04N 13/125; H04N 13/122; B60K 2370/149; B60K 2370/1529; B60K 2370/785; G06F 3/013; G02B 27/0075
See application file for complete search history.

(56) References Cited

U.S. PATENT DOCUMENTS

| | | | |
|---|---|---|---|
| 5,053,755 A | 10/1991 | Smith et al. | |
| 9,140,974 B2* | 9/2015 | Redmann | H04N 13/363 |
| 9,681,122 B2* | 6/2017 | Wilson | H04N 13/128 |
| 2022/0109815 A1* | 4/2022 | Kang | H04N 13/383 |
| 2022/0210397 A1* | 6/2022 | Kim | G02B 30/27 |

FOREIGN PATENT DOCUMENTS

| | | | | |
|---|---|---|---|---|
| CN | 112532964 A | * | 3/2021 | ........... H04N 13/125 |
| DE | 102016200136 A1 | * | 7/2017 | ......... G02B 27/0101 |
| DE | 102016207268 A1 | * | 11/2017 | |
| JP | 2012-83534 A | | 4/2012 | |
| KR | 10-1364767 B1 | | 2/2014 | |

(Continued)

*Primary Examiner* — John Villecco
(74) *Attorney, Agent, or Firm* — NSIP Law

(57) ABSTRACT

A processor-implemented method with crosstalk correction includes: determining a region in which a crosstalk is to occur based on a three-dimensional (3D) position relationship between a position of eyes of a user and a position of a virtual image of a virtual content object; generating a concealer image for correcting the region in which the crosstalk is to occur based on the determined region and the virtual content object; and correcting the crosstalk by combining the virtual content object and the generated concealer image.

52 Claims, 13 Drawing Sheets

(56) References Cited

FOREIGN PATENT DOCUMENTS

| KR | 10-1681059 B1 | 12/2016 | |
|---|---|---|---|
| WO | WO-2013089067 A1 * | 6/2013 | ............. G09G 3/003 |
| WO | WO-2013092219 A1 * | 6/2013 | ......... H04N 13/0018 |
| WO | WO 2017/056217 A1 | 4/2017 | |
| WO | WO-2022060387 A1 * | 3/2022 | |

* cited by examiner

METHOD AND APPARATUS WITH CROSSTALK CORRECTION

CROSS-REFERENCE TO RELATED APPLICATIONS

This application claims the benefit under 35 USC § 119(a) of Korean Patent Application No. 10-2020-0114028 filed on Sep. 7, 2020, and Korean Patent Application No. 10-2020-0181939 filed on Dec. 23, 2020, in the Korean Intellectual Property Office, the entire disclosures of which are incorporated herein by reference for all purposes.

BACKGROUND

1. Field

The following description relates to a method and apparatus with correcting a crosstalk.

2. Description of Related Art

For a stereo method that provides a three-dimensional (3D) effect through radiation of an image to each binocular viewpoint, graphic information may be input to both eyes. However, when accurate graphics are not radiated to both eyes due to a physical phenomenon (such as, for example, light flares or leaks), a 3D crosstalk may occur. For example, when a stereo image is separated unstably or incompletely due to an optical phenomenon such as light flares or leaks occurring in a glassless 3D display, and thus accurate augmented reality (AR) graphics are not radiated to both eyes of a user, the user may not experience a 3D stereo effect. To reduce such a 3D crosstalk, various methods, for example, a method of blurring an image or a method of reducing the brightness of an image, may be employed. However, using such methods may degrade the quality of an image.

The above description has been possessed or acquired by the inventor(s) in the course of conceiving the present disclosure and is not necessarily an art publicly known before the present application is filed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with crosstalk correction includes: determining a region in which a crosstalk is to occur based on a three-dimensional (3D) position relationship between a position of eyes of a user and a position of a virtual image of a virtual content object; generating a concealer image for correcting the region in which the crosstalk is to occur based on the determined region and the virtual content object; and correcting the crosstalk by combining the virtual content object and the generated concealer image.

The generating of the concealer image may include: adjusting one or more effect elements including any one or any combination of an afterimage range, a contrast, and a brightness of the concealer image.

The afterimage range of the concealer image may correspond to a width of the concealer image.

The adjusting of the one or more effect elements may include any one or more of: adjusting the afterimage range of the concealer image, corresponding to a size of the virtual image of the virtual content object, based on the 3D position relationship; adjusting either one or both of the contrast and the brightness of the concealer image based on the 3D position relationship; and adjusting the brightness of the concealer image based on an illumination of a surrounding environment.

The adjusting of the afterimage range of the concealer image may include: gradually expanding the afterimage range of the concealer image corresponding to the size of the virtual image of the virtual content object, as a distance between the position of the eyes of the user and the position of the virtual image increases while greater than a reference distance; and gradually reducing the afterimage range of the concealer image corresponding to the size of the virtual image of the virtual content object, as the distance between the position of the eyes of the user and the position of the virtual image decreases while greater than the reference distance.

The adjusting of either one or both of the contrast and the brightness of the concealer image may include: gradually adjusting either one or both of the contrast and the brightness of the concealer image to be darker, as a distance between the position of the eyes of the user and the position of the virtual image increases while greater than a reference distance; and gradually adjusting either one or both of the contrast and the brightness of the concealer image to be brighter, as the distance between the position of the eyes of the user and the position of the virtual image decreases while greater than the reference distance.

The adjusting of the brightness of the concealer image may include: gradually adjusting the brightness of the concealer image to be darker, as the illumination increases while greater than reference illumination; and gradually adjusting the brightness of the concealer image to be brighter, as the illumination decreases while greater than the reference illumination.

The generating of the concealer image may include: generating the concealer image by blurring the virtual content object according to a shape of the virtual content object.

The generating of the concealer image may include: generating a blurred image by blurring the virtual content object; and generating the concealer image by adjusting one or more effect elements including any one or any combination of an afterimage range, a contrast, and a brightness corresponding to the blurred image.

The generating of the blurred image may include: generating the blurred image according to a shape expanded from the virtual content object based on the 3D position relationship.

The generating of the blurred image may include: generating a first blurred image corresponding to a left eye of the eyes of the user and a second blurred image corresponding to a right eye of the eyes of the user, based on a shape of the virtual content object; and generating the blurred image by combining the first blurred image and the second blurred image.

The generating of the blurred image by combining the first blurred image and the second blurred image may include: separating the first blurred image and the second blurred image from each other by a distance that is based on a disparity of the eyes of the user; and combining the first blurred image and the second blurred image while maintaining the distance.

The combining of the first blurred image and the second blurred image while maintaining the distance may include: generating the blurred image by interpolating the first blurred image and the second blurred image that are separated from each other.

The correcting of the crosstalk may include: arranging the concealer image in a 3D space including the virtual content object; generating a left image and a right image by rendering the virtual content object combined with the concealer image; and projecting the left image and the right image.

The correcting of the crosstalk may include: generating a left image and a right image by rendering the virtual content object; and projecting the left image, the right image, and the concealer image.

The determining of the region in which the crosstalk is to occur may include: determining the region in which the crosstalk is to occur based on a disparity between the eyes of the user and the 3D position relationship.

The determining of the region in which the crosstalk is to occur may include: determining the region in which the crosstalk is to occur by adjusting an afterimage range of the region in which the crosstalk is to occur based on a disparity between the eyes of the user and the 3D position relationship.

The method may include: detecting a movement of the position of the virtual content object, wherein the determining of the region in which the crosstalk is to occur may include: determining the region in which the crosstalk is to occur based on either one or both of the 3D position relationship and a disparity between the eyes of the user that is changed based on the detected movement of the position.

The region in which the crosstalk is to occur may correspond to a position and a range at and in which the concealer image is to be arranged.

A non-transitory computer-readable storage medium may store instructions that, when executed by a processor, configure the processor to perform the method.

In another general aspect, an apparatus with crosstalk correction includes: a sensor configured to sense a position of eyes of a user; and a processor configured to determine a region in which a crosstalk is to occur based on a three-dimensional (3D) position relationship between the position of the eyes of the user and a position of a virtual image of a virtual content object, generate a concealer image for correcting the region in which the crosstalk is to occur based on the determined region and the virtual content object, and correct the crosstalk by combining the virtual content object and the generated concealer image.

For the generating of the concealer image, the processor may be configured to: adjust one or more effect elements including any one or any combination of an afterimage range, a contrast, and a brightness of the concealer image.

For the adjusting of the one or more effect elements, the processor may be configured to perform any one or more of: adjusting the afterimage range of the concealer image, corresponding to a size of the virtual image of the virtual content object, based on the 3D position relationship; adjusting either one or both of the contrast and the brightness of the concealer image based on the 3D position relationship; and adjusting the brightness of the concealer image based on an illumination of a surrounding environment.

For the adjusting of the afterimage range of the concealer image, the processor may be configured to: gradually expand the afterimage range of the concealer image corresponding to the size of the virtual image of the virtual content object, as a distance between the position of the eyes of the user and the position of the virtual image increases while greater than a reference distance; and gradually reduce the afterimage range of the concealer image corresponding to the size of the virtual image of the virtual content object, as the distance between the position of the eyes of the user and the position of the virtual image decreases while greater than the reference distance.

For the adjusting of either one or both of the contrast and the brightness of the concealer image, the processor may be configured to: gradually adjust either one or both of the contrast and the brightness of the concealer image to be darker, as the distance between the position of the eyes of the user and the position of the virtual image increases while greater than the reference distance; and gradually adjust either one or both of the contrast and the brightness of the concealer image to be brighter, as the distance between the position of the eyes of the user and the position of the virtual image decreases while greater than the reference distance.

For the adjusting of the brightness of the concealer image, the processor may be configured to: gradually adjust the brightness of the concealer image to be darker, as the illumination increases while greater than reference illumination; and gradually adjust the brightness of the concealer image to be brighter, as the illumination decreases while greater than the reference illumination.

For the generating of the concealer image, the processor may be configured to: generate the concealer image by blurring the virtual content object according to a shape of the virtual content object.

For the generating of the concealer image, the processor may be configured to: generate a blurred image by blurring the virtual content object; and generate the concealer image by adjusting one or more effect elements including any one or any combination of an afterimage range, a contrast, and a brightness corresponding to the blurred image.

For the generating of the blurred image, the processor may be configured to: generate the blurred image according to a shape expanded from the virtual content object based on the 3D position relationship.

For the generating of the blurred image, the processor may be configured to: generate a first blurred image corresponding to a left eye of the eyes of the user and a second blurred image corresponding to a right eye of the eyes of the user, based on a shape of the virtual content object; and generate the blurred image by combining the first blurred image and the second blurred image.

For the generating of the blurred image by combining the first blurred image and the second blurred image, the processor may be configured to: separate the first blurred image and the second blurred image from each other by a distance that is based on a disparity between the eyes of the user; and combine the first blurred image and the second blurred image while maintaining the distance.

For the combining of the first blurred image and the second blurred image while maintaining the distance, the processor may be configured to: generate the blurred image by interpolating the first blurred image and the second blurred image that are separated from each other.

For the correcting of the crosstalk, the processor may be configured to: arrange the concealer image in a 3D space including the virtual content object; generate a left image and a right image by rendering the virtual content object combined with the concealer image; and project the left image and the right image.

For the correcting of the crosstalk, the processor may be configured to: generate a left image and a right image by rendering the virtual content object; and project the left image, the right image, and the concealer image.

For the determining of the region in which the crosstalk is to occur, the processor may be configured to: determine the region in which the crosstalk is to occur based on a disparity between the eyes of the user and the 3D position relationship.

For the determining of the region in which the crosstalk is to occur, the processor may be configured to: determine the region in which the crosstalk is to occur by adjusting an afterimage range of the region in which the crosstalk is to occur based on a disparity between the eyes of the user and the 3D position relationship.

The processor may be configured to: detect a movement of the position of the virtual content object; and for the determining of the region in which the crosstalk is to occur, determine the region in which the crosstalk is to occur based on either one or both of the 3D position relationship and a disparity between the eyes of the user that is changed based on the detected movement of the position.

The region in which the crosstalk is to occur may correspond to a position and a range at and in which the concealer image is to be arranged.

The apparatus may be a content visualizing device comprising a display configured to visualize the virtual content object combined with the generated concealer image by projecting onto a projection plane.

The apparatus may be an augmented reality (AR) glass device comprising a transparent display configured to visualize the virtual content object combined with the generated concealer image.

The apparatus may be vehicle comprising a head-up display (HUD) configured to visualize, on a projection plane, the virtual content object combined with the generated concealer image to be provided to the user, and the sensor may be configured to sense a position of the vehicle.

In another general aspect, a content visualizing device includes: a processor configured to determine a region in which a crosstalk is to occur based on a three-dimensional (3D) position relationship between a position of eyes of a user and a position of a virtual image of a virtual content object, generate a concealer image for correcting the region in which the crosstalk is to occur based on the determined region and the virtual content object, and correct the crosstalk by combining the virtual content object and the generated concealer image; and a display configured to visualize the virtual content object combined with the generated concealer image by projecting onto a projection plane.

In another general aspect, an augmented reality (AR) glass device includes: a processor configured to determine a region in which a crosstalk is to occur based on a three-dimensional (3D) position relationship between a position of eyes of a user and a position of a virtual image of a virtual content object, generate a concealer image for correcting the region in which the crosstalk is to occur based on the determined region and the virtual content object, and correct the crosstalk by combining the virtual content object and the generated concealer image; and a transparent display configured to visualize the virtual content object combined with the generated concealer image.

In another general aspect, a vehicle includes: a sensor configured to sense a position of the vehicle; a processor configured to determine the virtual content object based on the position of the vehicle, determine a region in which a crosstalk is to occur based on a three-dimensional (3D) position relationship between a position of the eyes of a user and a position of a virtual image of a virtual content object, generate a concealer image for correcting the region in which the crosstalk is to occur based on the determined region and the virtual content object, and correct the crosstalk by combining the virtual content object and the generated concealer image; and a head-up display (HUD) configured to visualize, on a projection plane, the virtual content object combined with the generated concealer image to be provided to the user.

In another general aspect, a crosstalk correcting method includes: generating a concealer image including an area around a virtual image of a virtual object, based on a shape of the virtual image and a distance between a position of eyes of a user and a position of the virtual image in a three-dimensional (3D) virtual space; and rendering a combination of the virtual object and the concealer image in the 3D virtual space.

The generating of the concealer image may include increasing a width of the concealer image in response to an increase in the distance.

The generating of the concealer image may include: in response to the distance being less than a threshold, adjusting a width of the concealer image a first amount in response to a change in the distance; and in response to the distance being greater than or equal to the threshold, adjusting the width of the concealer image a second amount in response to the change in the distance.

The first amount may be greater than the second amount.

The generating of the concealer image may include decreasing a brightness of the concealer image in response to an increase in the distance.

The generating of the concealer image may include: generating a left side image and a right side image, each corresponding to a shape of the virtual object; and generating the concealer image by combining the left side image and the right side image.

The combining of the left side image and the right side image may include interpolating the left side image and the right side image such that the concealer image includes an area of the left side image, an area of the right side image, and an area between the left side image and the right side image.

In another general aspect, a crosstalk correcting method includes: generating a concealer image including an area around a virtual image of a virtual object; adjusting either one or both of a width and a brightness of the concealer image, in response to a change in a distance between a position of eyes of a user and a position of the virtual image in a three-dimensional (3D) virtual space; and rendering a combination of the virtual object and the concealer image in the 3D virtual space.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
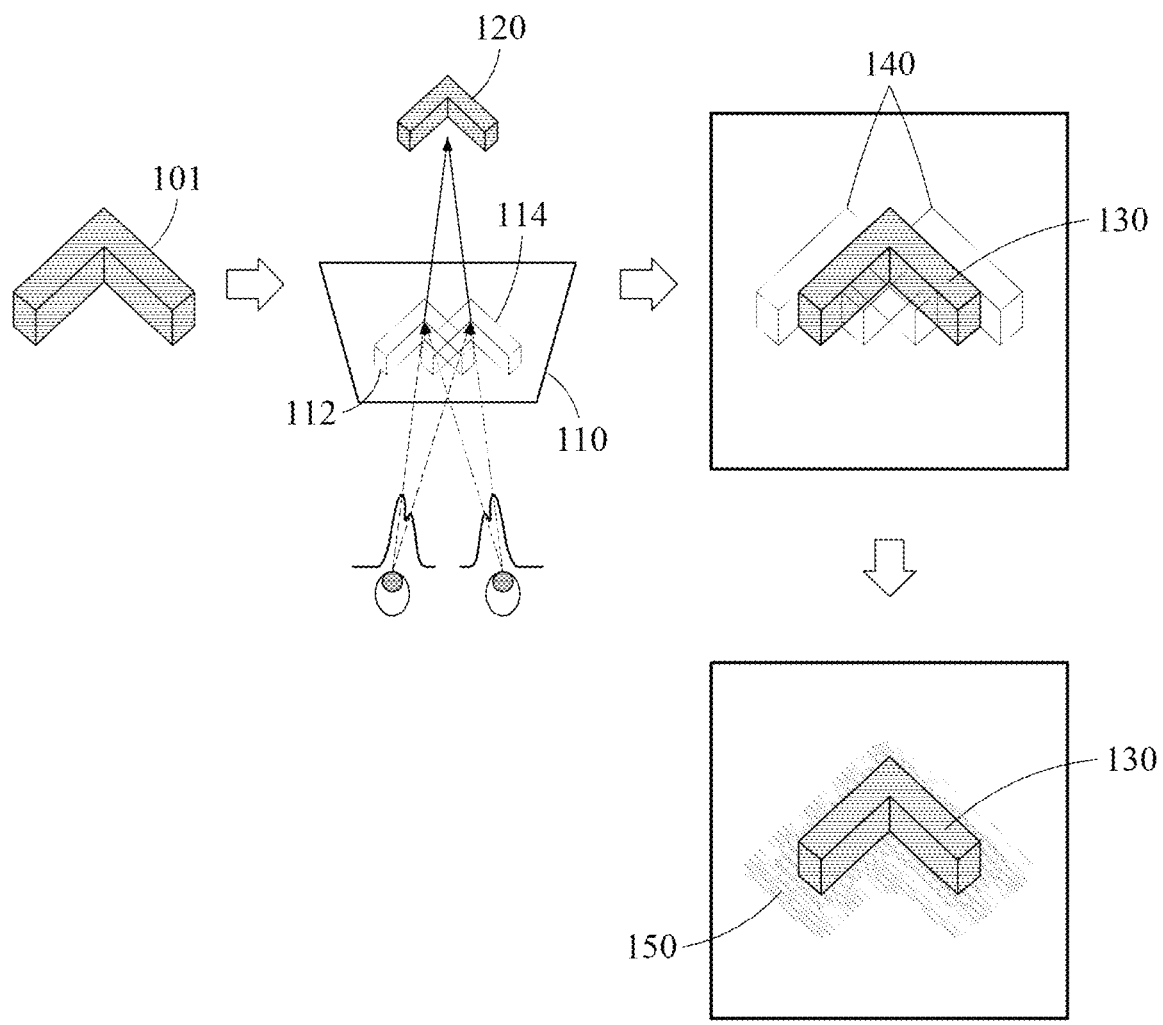
FIG. 1 illustrates an example of correcting a crosstalk.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

In addition, terms such as first, second, A, B, (a), (b), and the like may be used herein to describe components according to example embodiments. Each of these terminologies is not used to define an essence, order, or sequence of a corresponding component but used merely to distinguish the corresponding component from other component(s). Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element (such as a layer, region, or substrate) is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 illustrates an example of correcting a crosstalk. Referring to FIG. 1, in a case in which accurate graphics information associated with a target 101 to be visualized on a glassless three-dimensional (3D) display is not radiated to both eyes of a user, a crosstalk 140 may occur around a virtual content object 130 that is visualized on a virtual screen 110.

For example, a virtual image 120 of the target 101 that is to be virtualized through a left image 112 provided to a left eye of the user on the virtual screen 110 and a right image 114 provided to a right eye of the user on the virtual screen 110 may be visualized. In this example, due to an optical phenomenon such as light flares or leaks, a stereo image may be unstably or incompletely separated, and thus the left image 112 may be provided to the right eye of the user and the right image 114 may be provided to the left eye of the user. Thus, the left image 112 and the right image 114 may overlap each other around the virtual content object 130 displayed on the virtual screen 110, and the crosstalk 140 may thereby occur. The virtual screen 110 may be, for example, a virtual screen of a glassless 3D display or a head-up display (HUD), or a virtual screen of a transparent display of an augmented reality (AR) device such as an AR eyeglasses device. However, examples of the virtual screen 110 are not limited to the foregoing examples. Hereinafter, a non-limiting example of a virtual content object and a space in which the virtual content object is visualized will be described in further detail with reference to FIG. 2.

In a crosstalk correcting method of one or more embodiments, by attaching a rendered image 150 obtained by rendering a portion in which the crosstalk 140 occurs around the virtual content object 130, the crosstalk correcting method of one or more embodiments may cover the portion in which the crosstalk 140 occurs. The rendered image 150 obtained by rendering the portion in which the crosstalk 140 occurs is also referred to herein as a concealer image because it may conceal or hide the portion in which the crosstalk 140 occurs. Hereinafter, a rendered image obtained by rendering a portion in which a crosstalk occurs, and a concealer image will be construed as being the same.

For example, by generating the concealer image 150 by obtaining a hint from a color of the virtual content object 140, the crosstalk correcting method of one or more embodiments may naturally cover a region in which the crosstalk 140 occurs without disharmony or incompatibility with surroundings by the generated concealer image 150. Hereinafter, non-limiting examples of generating a concealer image will be described in further detail with reference to FIGS. 7 and 8.

In addition, by adjusting various effect elements including, for example, brightness by distance, the size of an area, outdoor brightness, HUD brightness, and color that are all related to the concealer image 150, and covering the portion in which the crosstalk 140 occurs, the crosstalk correcting method of one or more embodiments may offset an afterimage of the crosstalk 140. Here, an effect element may be used to provide a glow effect to the concealer image 150 to reduce disharmony or incompatibility with the surroundings. In an example, the afterimage of the crosstalk 140 may be an image of the crosstalk.

A range of the concealer image 150 may be determined based on a variation in a disparity that is based on a distance between a position of the virtual image 120 of the virtual content object visualized on the virtual screen 110 and a position of both eyes of the user. The range of the concealer image 150 may correspond to a size of the concealer image 150 with respect to a size of the virtual content object 130 (e.g., as determined by a width of the concealer 150 along a horizontal axis in FIG. 1). Hereinafter, a non-limiting example of a relationship between a binocular disparity and a distance between a position of a virtual image of a virtual content object and a position of both eyes of a user will be described in further detail with reference to FIG. 9.

In addition, a level of the brightness (or simply a brightness level) of the concealer image 150 may be adjusted based on illumination of an external environment and brightness of the virtual screen 110. In an example, by adjusting the effect elements of the concealer image 150 in various ways, the crosstalk correcting method of one or more embodiments may remove the crosstalk 140 occurring in the virtual screen 110 and optimize the brightness and definition of the virtual screen 110. Hereinafter, non-limiting examples of adjusting an effect element will be described in further detail with reference to FIGS. 10 through 12.

Figure 2:
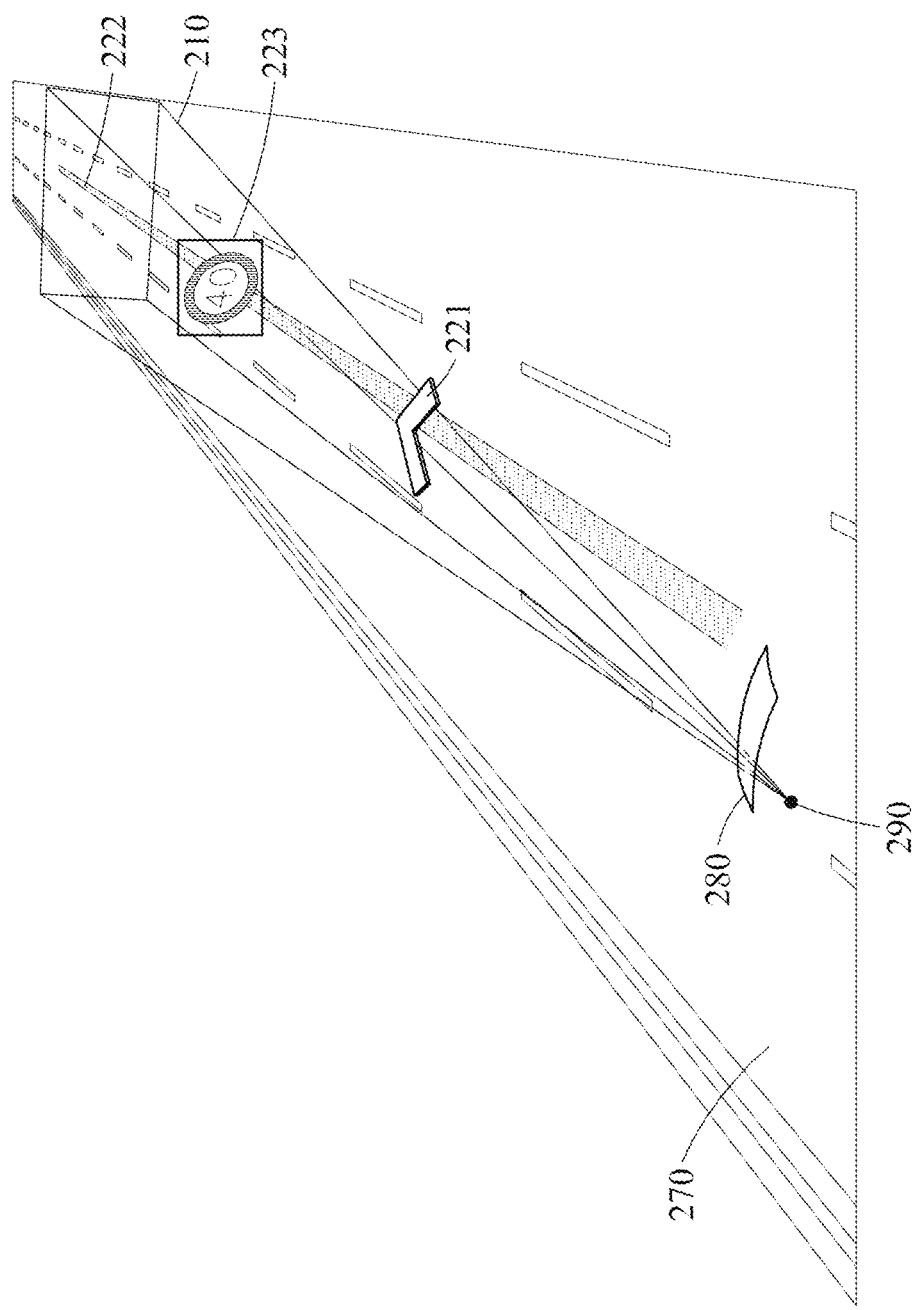
FIG. 2 illustrates an example of a virtual content object.

FIG. 2 illustrates an example of a virtual content object. Referring to FIG. 2, a result of visualizing a virtual content object may be displayed at a position in an object arrangement space 210. Hereinafter, for the convenience of description, an HUD will be provided as an example of a projection panel on which a virtual image of the virtual content object is displayed. However, examples are not limited to the foregoing, and the virtual content object may be visualized on various projection panels including, for example, a transparent display of an AR glasses device.

In an example, a crosstalk correcting apparatus of one or more embodiments (hereinafter, simply a "correcting apparatus") may combine a virtual content object and a concealer image to correct a crosstalk, and may visualize a virtual content object obtained by correcting the crosstalk. The virtual content object may include, for example, a graphic object corresponding to a route guidance content 221 provided in a form of an arrow.

For example, the correcting apparatus may arrange a graphic object at a position in the object arrangement space 210, and visualize the arranged graphic object. The correcting apparatus may provide a left image to a left eye of a user and a right image to a right eye of the user, to three-dimensionally provide the graphic object. The left image and the right image may each include a graphic object that are separated from each other, along a horizontal axis, by a disparity between both eyes of the user based on a depth. Thus, the user may recognize a sense of the depth of the graphic object that is three-dimensionally rendered.

However, in a case in which the left image is erroneously provided to the right eye of the user and the right image is erroneously provided to the left eye of the user, the left image and the right image may overlap each other, and a crosstalk may thereby occur.

In such a case, the correcting apparatus of one or more embodiments may correct a crosstalk by combining a concealer image for correcting a region in which the crosstalk is to occur and the virtual content object (as described above with reference to FIG. 1, for example). Hereinafter, non-limiting examples of a configuration of the correcting apparatus will be described in further detail with reference to FIGS. 3 and 4. In addition, a non-limiting example of a crosstalk correcting method performed by the correcting apparatus will be described in further detail with reference to FIG. 5.

Before describing the crosstalk correcting method, a virtual content object and a space in which the virtual content object is visualized will be described first.

The object arrangement space 210 may correspond to a 3D space in which a graphic object is arranged. For example, the object arrangement space 210 may be a space in which a graphic object having a depth is three-dimensionally visualized. A coordinate of each point in the object arrangement space 210 may be the same as a position coordinate in a physical world or mapped in a similar scale thereto. A boundary of the object arrangement space 210 may be determined based on a structure of an HUD. For example, the correcting apparatus may visualize the graphic object in a space from a minimum depth (e.g., a minimum distance) to a maximum depth (e.g., a maximum distance) that is determined based on the structure of the HUD.

The object arrangement space 210 may be determined based on a space corresponding to a visual field of the user. A shape and size of the object arrangement space 210 may be determined based on a size of an eye box 290 and a field of view (FOV) provided by the HUD. The object arrangement space 210 may be in a shape of a rectangular cone, for example, and be a space in a shape expanded from the eye box 290 based on the FOV. The eye box 290 may be a region that is set for both eyes of the user to be positioned. Although a position of the eye box 290 may be fixed, examples are not limited thereto. The position of the eye box 290 may change depending on a detected eye position of the user. In addition, the shape of the object arrangement space 210 is not limited to such a shape of a rectangular cone and may change or have a different shape, according to a design.

The correcting apparatus may visualize graphic representations of various types at a display position in the object arrangement space 210 over a windshield glass 280, and may be implemented to visualize the graphic representations of various types on different object arrangement spaces.

The types of the graphic representations that may be displayed in the object arrangement space 210 may include, for example, the route guidance content 221, a route indicating line 222, and a warning content 223. In addition to these example types, the types of the graphic representations displayable in the object arrangement space 210 may be implemented in various ways.

The user may recognize that the graphic representations are present at a physical position corresponding to the display position in the object arrangement space 210. As described above, each coordinate of the object arrangement space 210 may be mapped to a physical coordinate one to one. In addition, the virtual content object may occupy a space corresponding to its shape. For example, the virtual content object may occupy a portion of the object arrangement space 210.

The route guidance content 221 may be a content in which route guidance information that is to be provided for traveling on a route to a destination is visualized and may include, for example, a numeral and character indicating a distance the user is to go straight, an arrow indicating a turn at a crossroads (e.g., a left turn and a right turn), a speed limit on a road 270 of current traveling, a name of a region at a position of current traveling, a name of the road 270, and/or the like. The route guidance information may be information that guides the user to move based on a route set by the user and information associated with the route. For example, the route guidance information may include a distance by which the user is to go straight, a turn at a crossroads, and the like. The route may refer to a path the user is to pass through from a departure to a destination. In addition, the route guidance information may be information associated with a route or path to the destination and may include, for example, a position of the road 270, a region, a name, an attribute, and/or safety information (e.g., speed limit, construction information, and accident information, etc.) that are included in the path. The route indicating line 222 may refer to a line that indicates the route to the destination and may be visualized as the route guidance information of a form that is distinguished from the route guidance content 223. The warning content 223 may include a warning message that is to be given to the user, when in a determined traveling environment.

In addition, the correcting apparatus may estimate (e.g., determine) a position of a vehicle using a sensor (e.g., a camera sensor, a global navigation satellite system (GNSS) module, a radio detection and ranging (radar) sensor, a light detection and ranging (lidar) sensor, etc.). The correcting apparatus may perform visualization by matching a graphic object corresponding to the route guidance content 221 to the actual road 270 based on an error or difference between a position of the vehicle and a position of eyes of a driver of the vehicle, with respect to a position of the road 270, for example. For example, in a case in which high-definition (HD) map data is used, the correcting apparatus of one or more embodiments may match the route guidance content 221 at a more accurate position. Through such matching, the correcting apparatus of one or more embodiments may improve a psychological comfort or stability of the driver.

Although an example of correcting a crosstalk occurring in the route guidance content 221 that is an example of the virtual content object will be described for the convenience of description, examples are not limited thereto. The correcting of a crosstalk and the visualizing a content described herein are applicable to all graphic objects that may be visualized in an object arrangement space.

Figure 3:
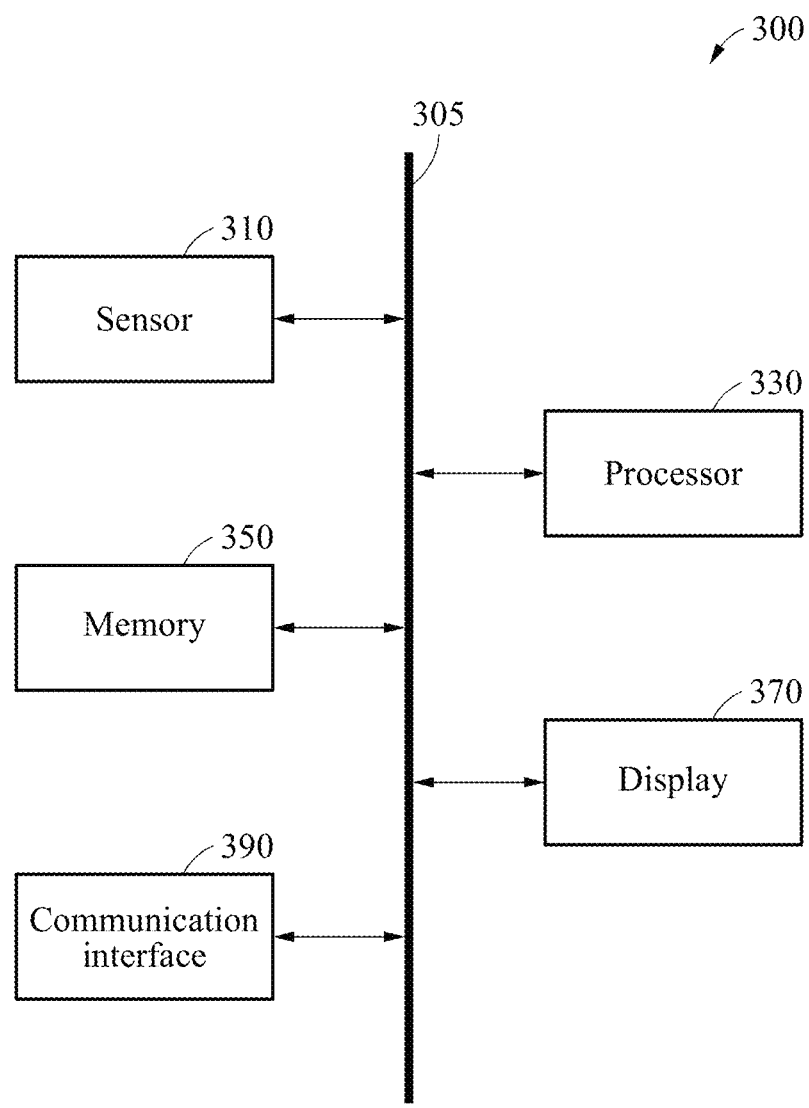
FIG. 3 illustrates an example of a crosstalk correcting apparatus.

FIG. 3 illustrates an example of a correcting apparatus. Referring to FIG. 3, a correcting apparatus 300 may include a sensor 310 (e.g., one or more sensors) and a processor 330 (e.g., one or more processors). The correcting apparatus 300 may also include a memory 350, a display 370, and a communication interface 390.

The sensor 310 may sense a position of both eyes of a user. The sensor 310 may be an eye tracker or an iris recognition sensor, for example. In addition, the sensor 310 may sense information for visualizing a content. In an example, the sensor 310 may measure a distance to an object positioned around the user and include a radar and a lidar, for example. In addition, the sensor 310 may sense information associated with a state of a device or apparatus in which the correcting apparatus 300 is provided. For example, in a case in which the correcting apparatus 300 is provided in a vehicle, the sensor 310 may sense vehicle-related information. The vehicle-related information may include, for example, position information associated with a position of the vehicle, road information associated with a road corresponding to the position of the vehicle, and travel-related information of the vehicle. The travel-related information may be information associated with traveling of the vehicle and include, for example, information associated with, for example, a speed, an acceleration, a position, fuel, and repair and maintenance of the vehicle. In addition, the sensor 310 may include an internal sensor that captures an image of the inside of the vehicle. The internal sensor may be, for example, a camera sensor (e.g., a color camera), an infrared sensor, a depth sensor, a thermal imaging sensor, and the like, but examples of which are not limited thereto. The internal sensor may obtain information associated with the eyes of the user in the vehicle, and allow the processor 330 to determine a position of the eyes of the user and use the determined position to set an object arrangement space and visualize a 3D image (e.g., a pair of a left image and a right image).

The position information of the vehicle may be a current coordinate at which the vehicle is positioned, and may even indicate lane information associated with a lane on which the vehicle is currently traveling. For example, the sensor 310 may obtain a two-dimensional (2D) coordinate of the vehicle through a GNSS. In addition, the sensor 310 may obtain a front image of a front side of the vehicle, and the processor 330 may determine an ego lane on which the vehicle is currently traveling among a plurality of lanes included in the road from the front image. However, examples are not limited to the foregoing, and the processor 330 may estimate a current position of the vehicle based on an image collected from the sensor 310.

The road information may include information associated with at least one of a width of the road, the number of lanes included in the road, a width of a lane, a centerline, a turn point, a traffic signal, and other traffic-related information.

The sensor 310 may be, for example, a sensor module including sensors of various types. Accordingly, the sensor 310 may include any one or any combination of a camera sensor, a GNSS module, a radar sensor, and a lidar sensor, as non-limiting examples.

The processor 330 may estimate a region in which a crosstalk is to occur based on a 3D position relationship between a position of both eyes of the user sensed by the sensor 310 and a position of a virtual image of a virtual content object. The processor 330 may generate a concealer image for correcting the region in which the crosstalk is to occur based on the estimated region and the virtual content object. The processor 330 may then correct the crosstalk by combining the virtual content object and the generated concealer image. The processor 330 may directly calculate the 3D position relationship between the position of the eyes of the user and the position of the virtual image of the virtual content object. Alternatively, the processor 330 may receive the 3D position relationship externally through the communication interface 390. The 3D position relationship may include a distance between the position of the eyes of the user and the position of the virtual image of the virtual content object.

In addition, the processor 330 may generate a content to be visualized through the display 370. For example, the processor 330 may generate an object arrangement space based on an estimated front road region. The processor 330 may render the virtual content object arranged in the object arrangement space in a form of being projected onto a projection plane, and may provide the virtual content object rendered in such a way to the user through the display 370. The processor 330 may adjust the virtual content object based on a shape in which the virtual content object is projected onto the projection plane. For example, the processor 330 may deform or rotate the virtual content object based on a reference point and a reference axis. However, operations of the processor 330 are not limited to the operations described above, and the processor 330 may also perform the foregoing operations along with at least one of operations to be described hereinafter with reference to FIGS. 4 through 13. Non-limiting examples of the operations of the processor 330 will be described in further detail with reference to FIGS. 4 through 13.

The processor 330 may be an image processing device embodied by hardware having a circuit of a physical structure to execute desired operations. The desired operations may include, for example, a code or instructions included in a program. The image processing device embodied by hardware may include, for example, a microprocessor, a central processing unit (CPU), a graphics processing unit (GPU), a processor core, a multi-core processor, a multi-processor, an application-specific integrated circuit (ASIC), a field-programmable gate array (FPGA), a neural processing unit (NPU), and the like.

The processor 330 may execute the program and control the correcting apparatus 300. The code of the program executed by the processor 330 may be stored in the memory 350.

The memory 350 may store information associated with the 3D position relationship including the distance between the position of the eyes of the user and the position of the virtual image of the virtual content object, and/or information associated with the region in which the crosstalk is to occur that is estimated by the processor 330. In addition, the memory 350 may store the concealer image, and/or a resulting image obtained by combining the virtual content object and the concealer image.

In addition, the memory 350 may temporarily or permanently store information used to visualize the content generated by the processor 330. For example, the memory 350 may be executed by the processor 330 to store instructions for performing non-limiting example operations to be further described hereinafter with reference to FIGS. 4 through 13. In addition, the memory 350 may store the virtual content object, route guidance information, a map database, and the like. The map database may refer to a database configured to store therein map data. The map database may store HD map data, for example. The HD map data may include information associated with fine data, such as, for example, the number of lanes, a width of a lane, a position of a centerline, and the like.

The display 370 may visualize a virtual content object obtained by correcting the crosstalk and provide the visualized virtual content object to the user. The display 370 may visualize the virtual content object by projecting the virtual content object to a projection plane. For example, the display 370 may be an HUD that forms a projection plane in front of a user and provides a content to the user through the projection plane. For another example, the display 370 may be a transparent display of an AR glass or an AR glass device that visualizes a virtual content object. In such an example, the transparent display may visualize the virtual content object obtained by correcting the crosstalk in an actual surrounding environment.

In an example, the display 370 may provide a left image to a left eye of the user and a right image to a right eye of the user. For example, when the processor 330 generates a left image including a first graphic representation corresponding to a left eye of a driver and a right image including a second graphic representation corresponding to a right eye of the driver, the display 370 may provide the left image and the right image such that they have a disparity therebetween. The display 370 may visualize a content having a depth as a stereoscopic graphic object and provide the visualized content to the user, by separating a graphic object by which the content is visualized in the left image from a graphic object by which the content is visualized in the right image based on a binocular disparity. The disparity may be determined for each pixel of the graphic object, and a sense of depth may be expressed for each pixel. For example, pixels in the graphic object corresponding to a proximal part that is close to the user may be separated by a large disparity in the left image and the right image. Conversely, pixels in the graphic object corresponding to a distal part that is far away from the user may be separated by a small disparity in the left image and the right image.

For example, the display 370 may visualize a graphic object corresponding to a route guidance content in a display region determined by the processor 330. The position of both eyes of the user may be measured by the sensor 310 (e.g., an internal sensor), and the measured position of the eyes of the user may be provided to the processor 330. The position of the eyes of the user may be permanently tracked while a vehicle is moving such that a content is three-dimensionally conveyed even when a driver of the vehicle moves his/her head vertically or horizontally or adjusts the height of the driver's seat.

The communication interface 390 may receive the 3D position relationship including the distance between the position of the eyes of the user and the position of the virtual image of the virtual content object from the outside of the correcting apparatus 300. Alternatively, the communication interface 390 may output, to the outside of the correcting apparatus 300, a resulting image obtained by the processor 330 by combining the virtual content object and the concealer image, and/or a resulting image obtained by visualizing, on the projection plane, the virtual content object obtained by correcting the crosstalk.

The correcting apparatus 300 may be a device used in various fields, for example, an advanced driver assistance system (ADAS), an HUD device, a 3D digital information display (DID), a navigation device, a neuromorphic device, a 3D mobile device, a smartphone, a smart television (TV), a smart vehicle, an Internet of things (IoT) device, a medical device, a measurement device, and the like. The 3D mobile device may include all display devices for displaying AR, virtual reality (VR), and/or mixed reality (MR), such as, for example, a head mounted display (HMD), a face mounted display (FMD), and the like.

Alternatively, the correcting apparatus 300 may be embodied as a 3D HUD device for a vehicle, a navigation device configured to indicate a traveling route of a vehicle, and the like. Also, the correcting apparatus 300 may be embodied to provide a user with AR. For example, the correcting apparatus 300 may display a content with a depth of a preset range (e.g., 3.7 meters (m) to 70 m from a vehicle) beyond a hood of the vehicle. However, applications of the correcting apparatus 300 are not limited to the foregoing examples.

Figure 4:
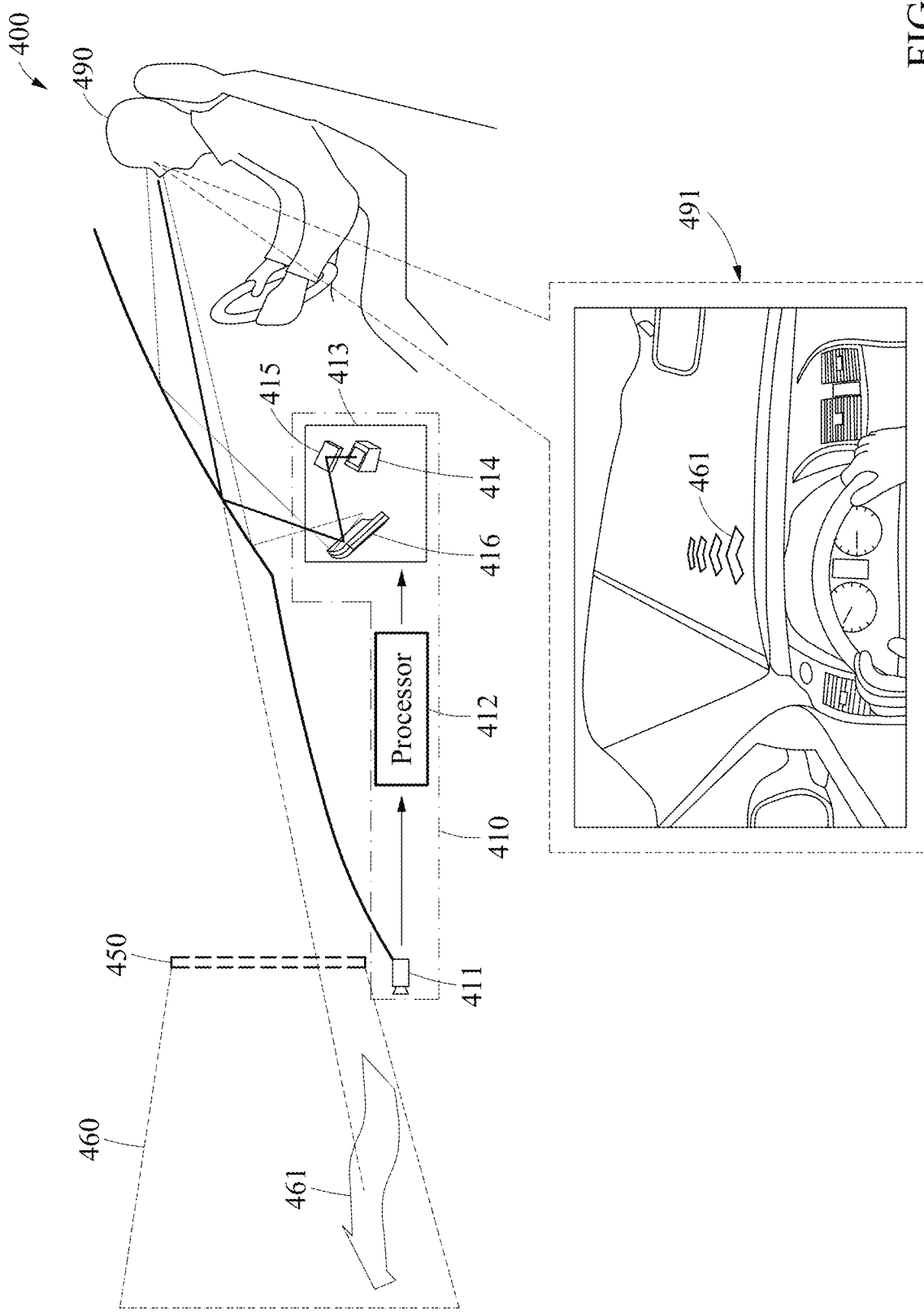
FIG. 4 illustrates an example of a head-up display (HUD) configured to display a virtual content object obtained by correcting a crosstalk.

FIG. 4 illustrates an example of an HUD configured to display a virtual content object obtained by correcting a crosstalk. In the example of FIG. 4, illustrated is a configuration of an HUD 413 of a correcting apparatus 410.

Referring to FIG. 4, a content visualizing system 400 which is a system for providing a virtual content object 461 to a user 490 may be a system in which the correcting apparatus 410 is provided.

The correcting apparatus 410 may include a sensor 411 (e.g., one or more sensors), a processor 412 (e.g., one or more processors), and the HUD 413.

The sensor 411 may detect an object present in front. For example, the sensor 411 may measure a distance to the object present in front. However, examples are not limited to the foregoing example, and the sensor 411 may measure a distance to an object present around a vehicle and generate a nearby distance map indicating the measured distance to the object present nearby. In addition, the sensor 411 may capture an image of an environment on a front side, a rear side, a left side, and a right side of the vehicle to generate the image. The sensor 411 may include a module (e.g., a GNSS) configured to measure and estimate a position of the correcting apparatus 410.

The processor 412 may obtain (e.g., determine) the virtual content object 461 to be provided to the user 490. The virtual content object 461 may be an object used to provide information to the user 490. In addition, the processor 412 may analyze nearby information (e.g., an image including objects and a distance to nearby objects) sensed by the sensor 411 to perform operations of modeling an object, detecting a position of the object, and recognizing the object, for example. For another example, the processor 412 may determine a current position of the correcting apparatus 410. The processor 412 may select the virtual content object 461 to be provided to the user 490 based on a FOV-based object arrangement space and load the selected virtual content object 461.

The HUD 413 may visualize the virtual content object 461 in a visible region of the user 490 in front of the user 490. For example, the HUD 413 may visualize the virtual content object 461 on a glass window (e.g., a windshield glass of the vehicle) arranged in front of the user 490. The HUD 413 may form a virtual projection plane 450. The virtual projection plane 450 may refer to a plane on which a virtual image including the virtual content object 461 generated by the HUD 413 is displayed. The user 490 may recognize the virtual image as being displayed on the projection plane 451. The projection plane 450 may be formed in an observable region of the eyes of the user 490.

In addition, the HUD 413 may visualize the virtual content object 461 having a depth in the projection plane 450. For example, the processor 412 may determine a depth by which the virtual content object 461 is visualized for each pixel included in a corresponding object based on the projection plane 450. In this example, based on the determined depth, the HUD 413 may visualize the virtual content object 461 such that it has a depth that is far from or close to the projection plane 450 from the user 450. That is, a binocular disparity may be determined for each pixel included in the virtual content object 461. The HUD 413 may visualize, on the projection plane 450, the virtual content object 461 having the depth in the visible region. The processor 412 may render the virtual content object 461 as a 3D graphic representation based on an optical system of the HUD 413. The 3D graphic representation may refer to a stereoscopic graphic representation having a depth, which is referred to herein as a graphic object. The HUD 413 may form the projection plane 450 to which a left image and a right image are output based on the depth of the virtual content object 461, and provide the left image to a left eye of the user 490 and the right image to a right eye of the user 490 through the formed projection plane 450. Thus, the user 490 may recognize a sense of the depth of the virtual content object 461 that is rendered three-dimensionally.

For example, as illustrated, the HUD 413 may include an image generator 414, a fold mirror 415, and a concave mirror 416. However, components of the HUD 413 are not limited to the foregoing example, and the HUD 413 may include various components that form the projection plane 450 on which a virtual image is formed through projection to a glass window arranged in front of the user 490 according to a design.

Although the correcting apparatus 410 provided in the vehicle is described above, examples of the correcting apparatus 410 are not limited thereto. For example, the correcting apparatus 410 may also be applicable to a technology for combining real and virtual information as in an AR glass device and an MR device, for example.

In an example, the correcting apparatus 410 may represent a continuous depth without a change in a position of the projection plane 450 formed by the HUD 413, by adjusting the depth of the virtual content object 461. In addition, as the correcting apparatus 410 may represent the continuous depth without the change in the position of the projection plane 450, the correcting apparatus 410 may not require physical manipulation of the components included in the HUD 413. For example, in a case in which the correcting apparatus 410 is provided in a vehicle, the correcting apparatus 410 may dynamically visualize the 3D virtual content object 461 in front of a driver of the vehicle. As illustrated in FIG. 4, a scene 491 that is observed by the user 490 may include the virtual content object 461 that is visualized with actual physical objects (e.g., a road) and background overlapping.

The correcting apparatus 410 of one or more embodiments may adjust at least one effect element of a concealer image of the virtual content object 461 for more natural visualization. Hereinafter, non-limiting examples of detailed operations of the correcting apparatus 410 will be further described with reference to the accompanying drawings.

Figure 5:
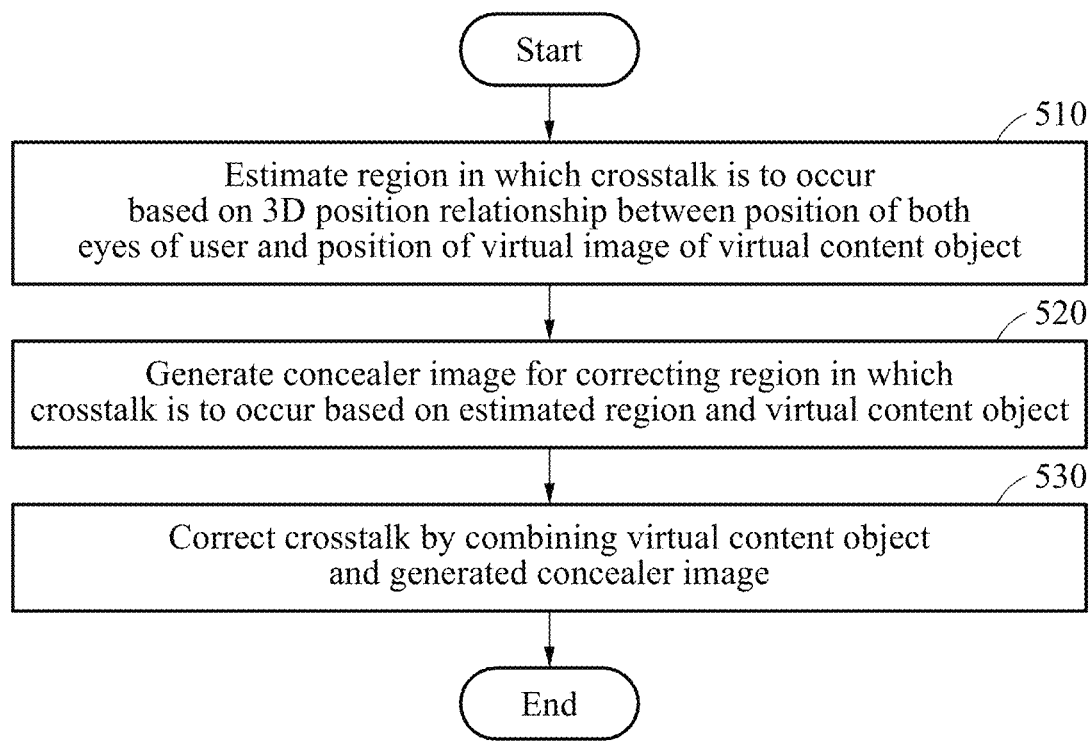
FIG. 5 illustrates an example of a crosstalk correcting method.
Figure 6:
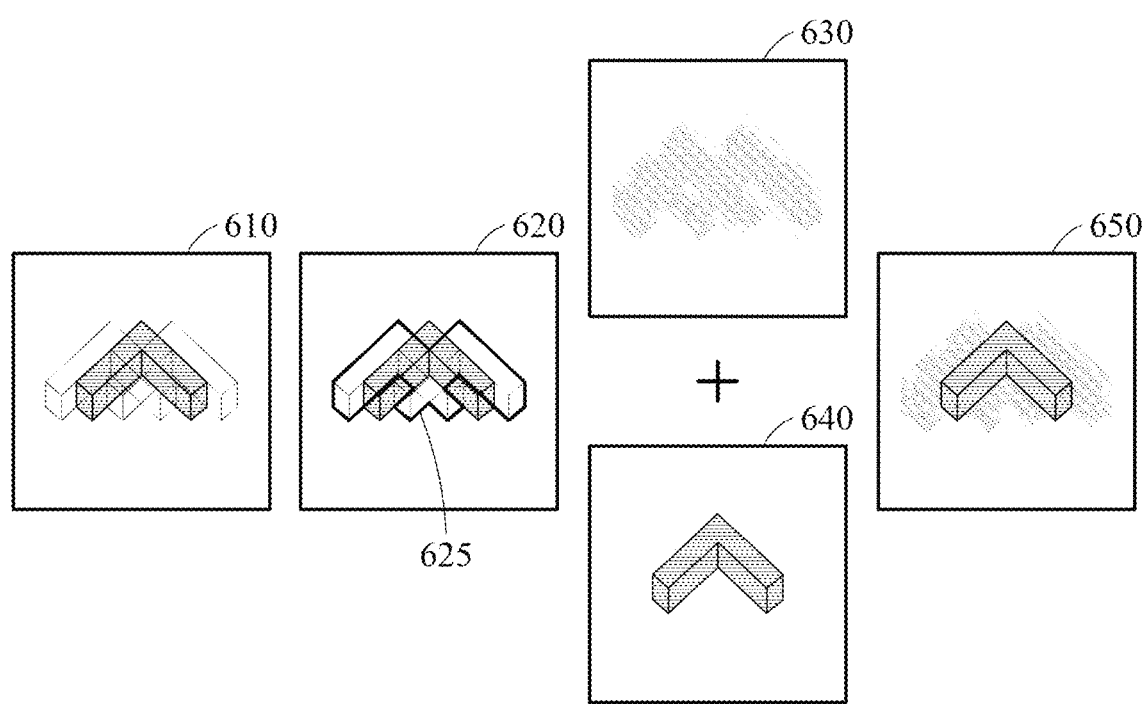
FIG. 6 illustrates an example of correcting a crosstalk.

FIG. 5 illustrates an example of a crosstalk correcting method. FIG. 6 illustrates an example of correcting a crosstalk. Referring to FIGS. 5 and 6, a correcting apparatus may correct a crosstalk of a virtual content object by performing operations 510 through 530 to be further described hereinafter.

In operation 510, the correcting apparatus may estimate a region in which a crosstalk is to occur based on a 3D position relationship between a position of both eyes of a user and a position of a virtual image of a virtual content object. The 3D position relationship may include a distance between the position of the eyes of the user and the position of the virtual image of the virtual content object.

For example, as illustrated in FIG. 6, the correcting apparatus may estimate a region 625 in which a crosstalk is to occur, as shown in area 620, in a virtual screen 610 based on a binocular disparity of the user and the 3D position relationship, in operation 510. In this example, the region 625 in which the crosstalk is to occur may correspond to a position at which a concealer image is to be rendered for correcting the crosstalk, which may correspond to a position and a range at and in which the concealer image is to be arranged. The correcting apparatus may estimate the region 625 in which the crosstalk is to occur by adjusting an afterimage range (e.g., an afterimage width) of the region 625 in which the crosstalk is to occur based on the binocular disparity of the user and the 3D position relationship. For example, as the distance between the position of the eyes of the user and the position of the virtual image increases to be greater than a preset reference distance, the correcting apparatus may gradually expand the afterimage range to estimate the region 625 in which the crosstalk is to occur. For example, as the distance increases, when the distance is greater than the preset reference distance, the correcting apparatus may gradually expand the afterimage range to estimate the region 625 in which the crosstalk is to occur. Conversely, as the distance between the position of the eyes of the user and the position of the virtual image decreases to be less than the reference distance, the correcting apparatus may gradually reduce the afterimage range to estimate the region 625 in which the crosstalk is to occur. For example, as the distance decreases, when the distance is less than the reference distance, the correcting apparatus may gradually reduce the afterimage range to estimate the region 625 in which the crosstalk is to occur.

In addition, the correcting apparatus may detect a movement of a position of the virtual content object. In such a case, the correcting apparatus may estimate the region 625 in which the crosstalk is to occur based on either one or both of the 3D position relationship and the binocular disparity of the user that is changed by the movement of the position.

In operation 520, the correcting apparatus may generate a concealer image (e.g., a concealer image 630) for correcting the region (e.g., the region 625) in which the crosstalk is to occur based on the region (e.g., the region 625) estimated in operation 510 and the virtual content object (e.g., a virtual content object 640). For example, the correcting apparatus may generate the concealer image 630 based on a color of the virtual content object 640. The correcting apparatus may generate the concealer image 630 by blurring the virtual content object 640 according to a shape of the virtual content object 640. Here, a degree of the blurring of the virtual content object 640 may be adjusted in various ways by, for example, illumination of a surrounding environment, brightness of the 3D position relationship including the distance between the position of the eyes of the user and the position of the virtual image of the virtual content object 640, and/or brightness of the virtual content object 640.

In addition, the correcting apparatus may adjust at least one of effect elements including, for example, an afterimage range, contrast, and brightness of the concealer image 630.

For example, in operation 520, the correcting apparatus may adjust the afterimage range of the concealer image 630 corresponding to the size of the virtual content object 640 based on the 3D position relationship, or adjust the contrast of the concealer image 630. The correcting apparatus may adjust the brightness of the concealer image 630 based on the illumination of the surrounding environment, or adjust a combination of the afterimage range, the contrast, and the brightness of the concealer image 630 based on the 3D position relationship and the illumination of the surrounding environment. Non-limiting examples of the generating of the concealer image by the correcting apparatus will be described in further detail with reference to FIGS. 7 through 12.

In operation 530, the correcting apparatus may correct the crosstalk by combining the virtual content object (e.g., the virtual content object 640) and the generated concealer image (e.g., the concealer image 630). For example, referring to FIG. 6, the correcting apparatus may correct the crosstalk by covering the region 625 in which the crosstalk occurs as shown in an image 650 by combining the virtual content object 640 and the concealer image 630. The term "combining" (or "combined" and "combination") used herein may include "superposing" (or "superposed" and "superposition").

In an example, the correcting apparatus may combine the virtual content object 640 and the concealer image 630 by arranging the concealer image 630 in a 3D space including the virtual content object 640. The correcting apparatus may render an image 650 with the virtual content object 640 and the concealer image 630 superposed together. The correcting apparatus may then provide a virtual content object obtained by correcting the crosstalk to the user by visualizing (e.g., projecting) a left image and right image that are obtained by the rendering.

In another example, the correcting apparatus may render the virtual content object. The correcting apparatus may provide, to the user, the virtual content object obtained by correcting the crosstalk by superposing the left image and the right image that are generated as a result of the rendering along with the concealer image and by visualizing (e.g., projecting) them.

Figure 7:
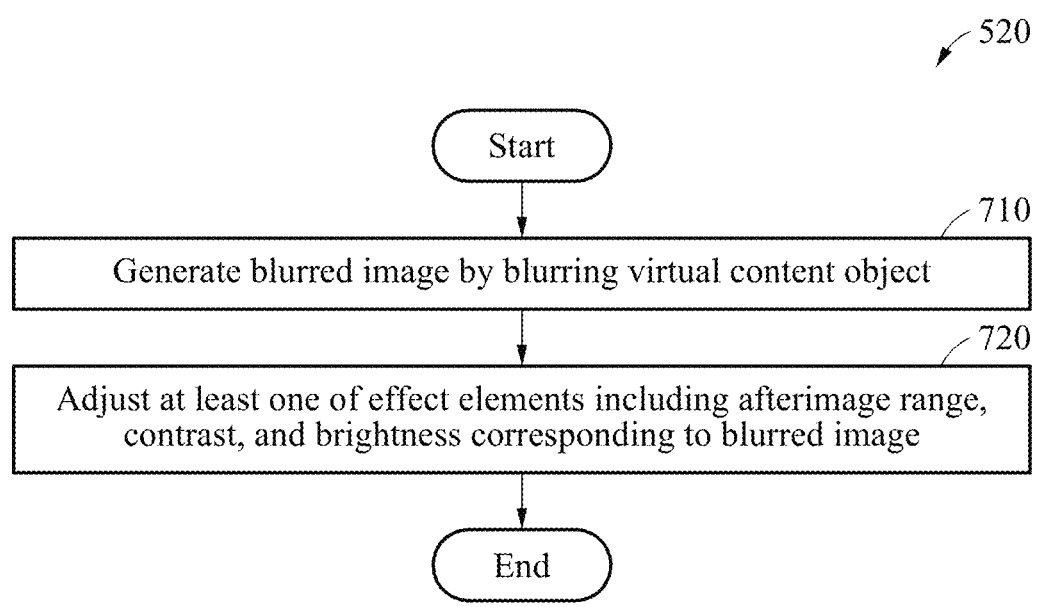
FIG. 7 illustrates an example of generating a concealer image.

FIG. 7 illustrates an example of generating a concealer image. Referring to FIG. 7, a correcting apparatus may adjust at least one effect element through operations 710 and 720 to be described hereinafter.

In operation 710, the correcting apparatus may generate a blurred image by blurring a virtual content object. A non-limiting example of the generating of the blurred image by the correcting apparatus will be described in further detail with reference to FIG. 8.

In operation 720, the correcting apparatus may adjust at least one of effect elements including an afterimage range, contrast, and brightness corresponding to the blurred image. The adjusting of the at least one effect element by the correcting apparatus will be described in detail with reference to FIGS. 10 through 12.

Figure 8:
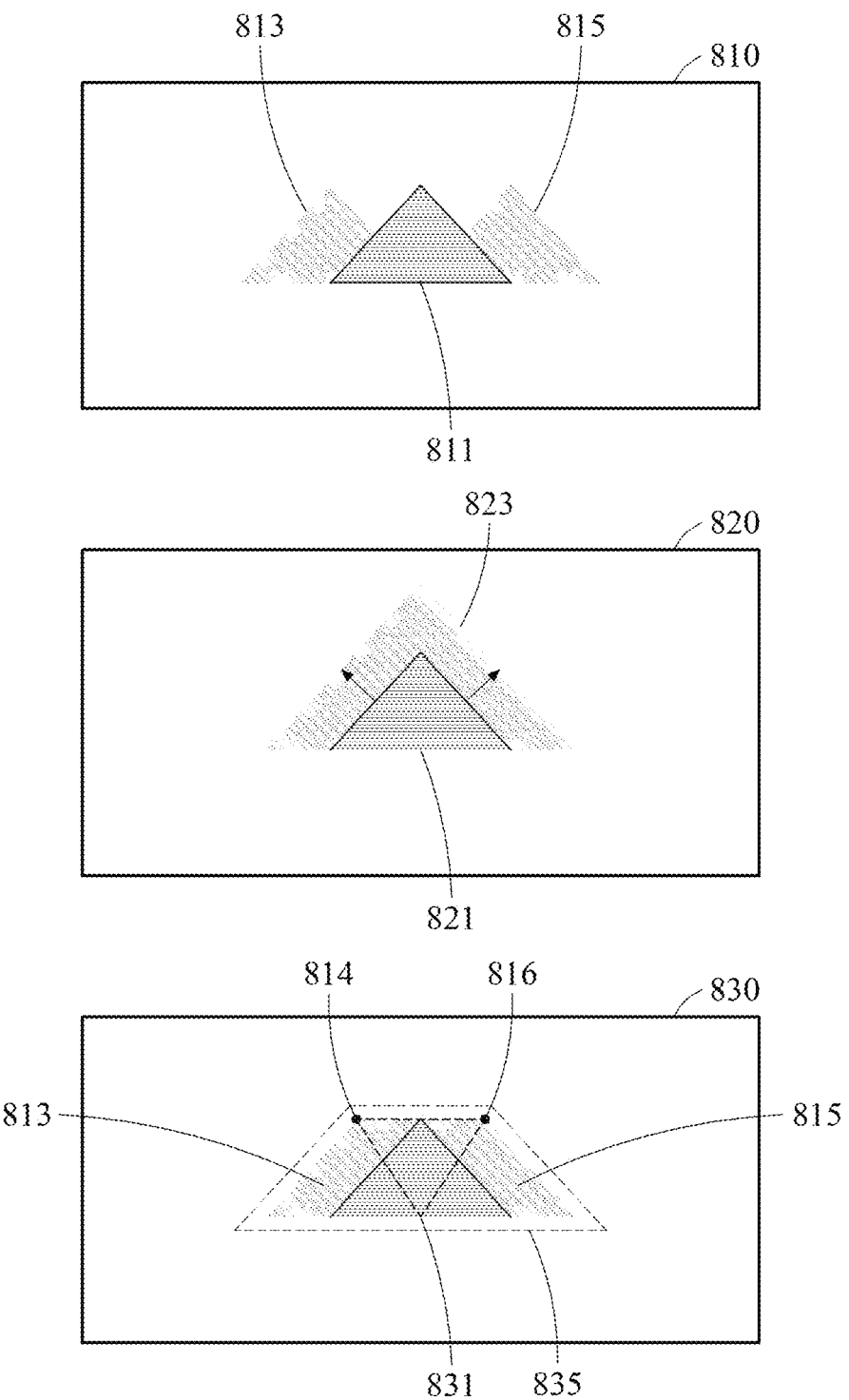
FIG. 8 illustrates an example of generating a blurred image.

FIG. 8 illustrates an example of generating a blurred image. Referring to FIG. 8, resulting images 810, 820, and 830 may be obtained by combining a virtual content object and blurred images 813, 815, 823, and 835 generated by blurring an intrinsic shape of the virtual content object.

For example, a correcting apparatus may generate the blurred images 813 and 815 such that the intrinsic shape (e.g., a triangular shape) of a virtual content object 811 is maintained as shown in the resulting image 810, and may combine the generated blurred images 813 and 815 with the virtual content object 811. In such an example, the correcting apparatus may generate the first blurred image 813 corresponding to a left eye of a user and the second blurred image 815 corresponding to a right eye of the user based on the shape of the virtual content object 811. In this example, each of the first blurred image 813 and the second blurred image 815 may correspond to the intrinsic shape of the virtual content object 811.

The correcting apparatus may generate a blurred image by combining the first blurred image 813 and the second blurred image 815. The correcting apparatus may separate the first blurred image 813 and the second blurred image 815 by a distance based on a binocular disparity of both eyes of the user. The correcting apparatus may combine the first blurred image 813 and the second blurred image 815 such that the distance is maintained. In this example, a portion of the first blurred image 813 and a portion of the second blurred image 815 may be superposed on each other or separated from each other, based on the disparity between both eyes of the user.

The correcting apparatus may determine, to be a concealer image, the blurred image obtained by combining the first blurred image 813 and the second blurred image 815 as shown in the resulting image 810 based on the binocular disparity of the user, and then correct a crosstalk by combining the concealer image with the virtual content object 811. A non-limiting examples of a relationship between both eyes of a user and a binocular disparity between the eyes of the user will be described in further detail with reference to FIG. 9.

Alternatively, the correcting apparatus may combine, with a virtual content object 821, the blurred image 823 generated in a shape expanded from an intrinsic shape of the virtual content object 821, as shown in the resulting image 820. The correcting apparatus may expand the virtual content object 821 upward, downward, leftward, and rightward based on a 3D position relationship including a distance between a position of both eyes of the user and a position of a virtual image of the virtual content object 821. For example, the correcting apparatus may expand the virtual content object 821 only upward as shown in the resulting image 820 without expanding the virtual content object 821 downward, based on the 3D position relationship. Alternatively, the correcting apparatus may expand the virtual content object 821 both upward and downward.

The correcting apparatus may generate the blurred image 823 corresponding to the shape expanded from the virtual content object 821. The correcting apparatus may determine the blurred image 823 to be a concealer image and combine the determined concealer image with the virtual content object 821 to correct the crosstalk.

Also, the correcting apparatus may generate the blurred image 835 by interpolating a left side and a right side of the blurred images 813 and 815 generated such that an intrinsic shape of a virtual content object 831 is maintained, as shown in the resulting image 830.

The correcting apparatus may generate the blurred image 835 through the interpolation that connects one point (e.g., a vertex) 814 of the separated blurred image 813 and one point (e.g., a vertex) 816 of the separated blurred image 815. The correcting apparatus may determine the generated blurred image 835 to be the concealer image and combine the determined concealer image with the virtual content object 831 to correct the crosstalk.

Figure 9:
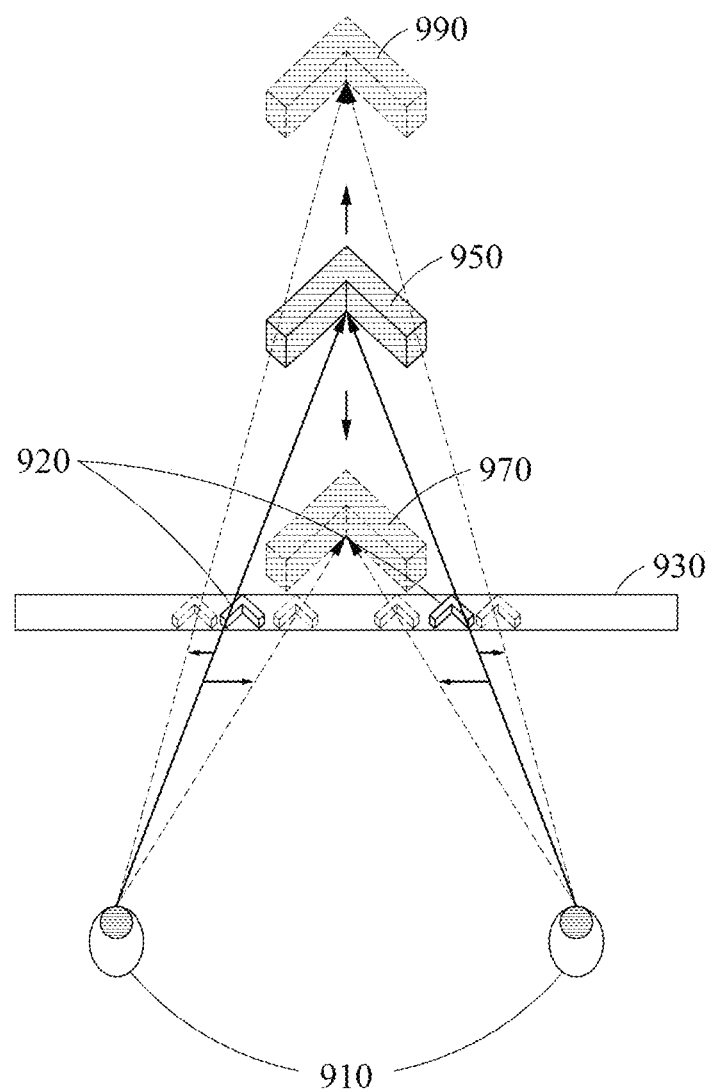
FIG. 9 illustrates an example of a principle in which a disparity increases as a distance between both eyes of a user and a virtual content object increases.

FIG. 9 illustrates an example of a principle in which a disparity increases as a distance between both eyes of a user and a virtual content object increases. In the example of FIG. 9, illustrated are left and right images 920, a display 930 that displays a virtual content object visualized by the left and right images 920, and virtual images 950, 970, and 990 of the virtual content object visualized by the left and right images 920. In an example, the distance between both eyes of the user and the virtual content object may equal either one or both of a first distance between a left eye of the user and the virtual content object and a second distance between a right eye of the user and the virtual content object (e.g., the first distance may equal the second distance). In another example, the distance between both eyes of the user and the virtual content object may be a distance, along a normal of a plane of both eyes of the user, from the plane to the virtual content object.

A correcting apparatus may three-dimensionally provide a graphic object by providing a left image to a left eye of a user and a right image to a right eye of the user. The left image and the right image may include graphic objects that are separated by a disparity that is based on a depth along a horizontal axis of the display 930. Thus, the user may recognize a sense of depth of a stereoscopically rendered graphic object.

The display 930 may separate the graphic objects in the left and right images 920 in which a content is visualized based on a disparity between both eyes 910 of the user, and visualize the content having the depth as the stereoscopic graphic object and provide the visualized content to the user. For each pixel of the graphic object, a disparity may be determined, and thus a sense of depth may be expressed for each pixel. Thus, the disparity between the eyes 910 of the user may vary depending on a distance between the eyes 910 of the user and each of the virtual images 950, 970, and 990 of the virtual content object.

For example, in a case in which a second distance between a position of the eyes 910 of the user and a position of the virtual image 990 of the virtual content object is greater than a first distance between the position of the eyes 910 of the user and a position of the virtual image 950 of the virtual content object, the disparity between the eyes 910 of the user corresponding to the second distance may increase compared to the disparity between the eyes 910 of the user corresponding to the first distance. For another example, in a case in which a third distance between the position of the eyes 910 of the user and a position of the virtual image 970 of the virtual content object is less than the first distance, the disparity between the eyes 910 of the user corresponding to the third distance may decrease compared to the disparity between the eyes 910 of the user corresponding to the first distance. As described above, as a distance between a position of both eyes of a user and a position of a virtual image of a virtual content object increases, a binocular disparity may increase. Conversely, as the distance between the position of the eyes of the user and the position of the virtual image of the virtual content object decreases, the binocular disparity may decrease.

Figure 10:
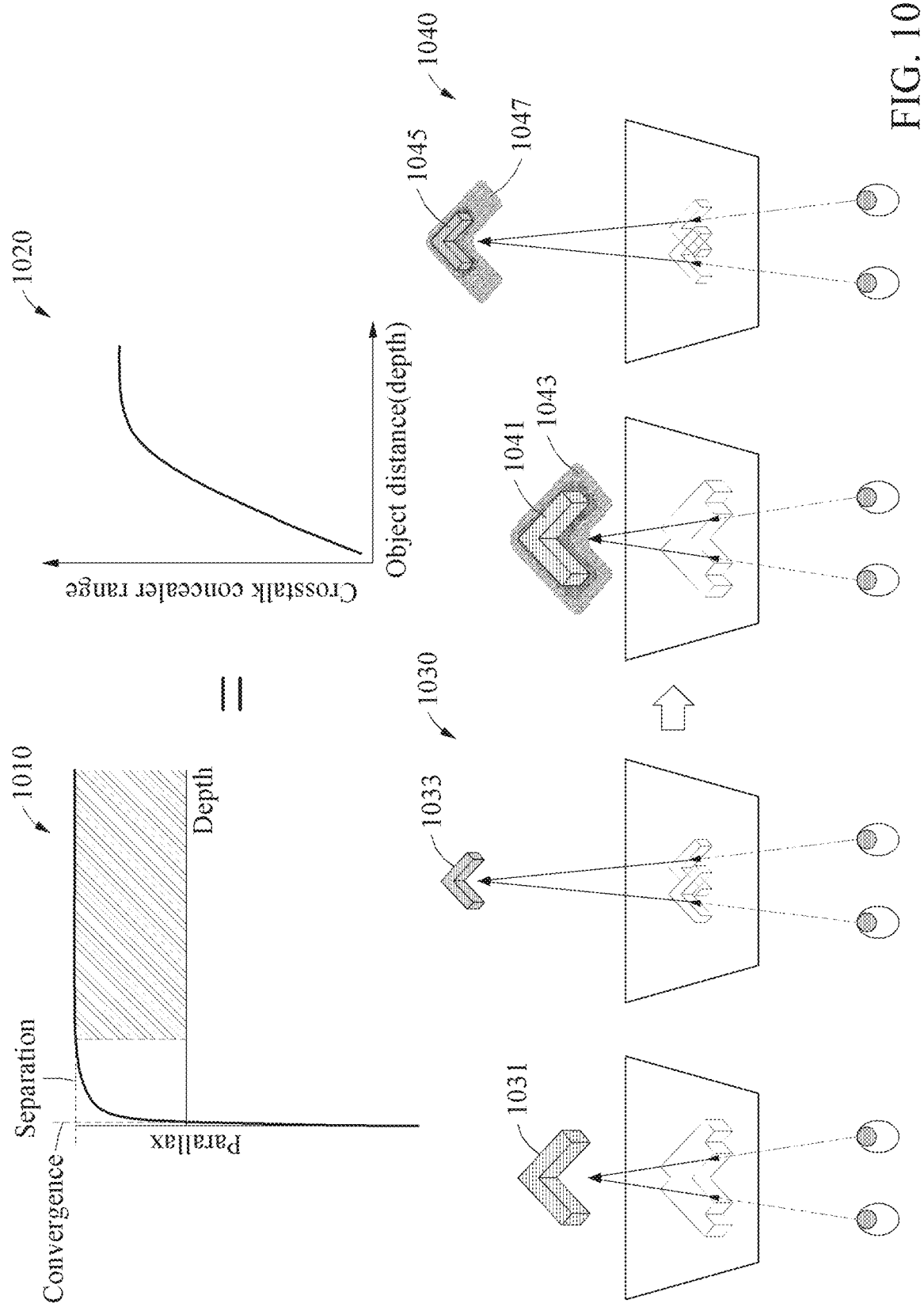
FIGS. 10 through 12 illustrate examples of adjusting at least one effect element.
Figure 11:
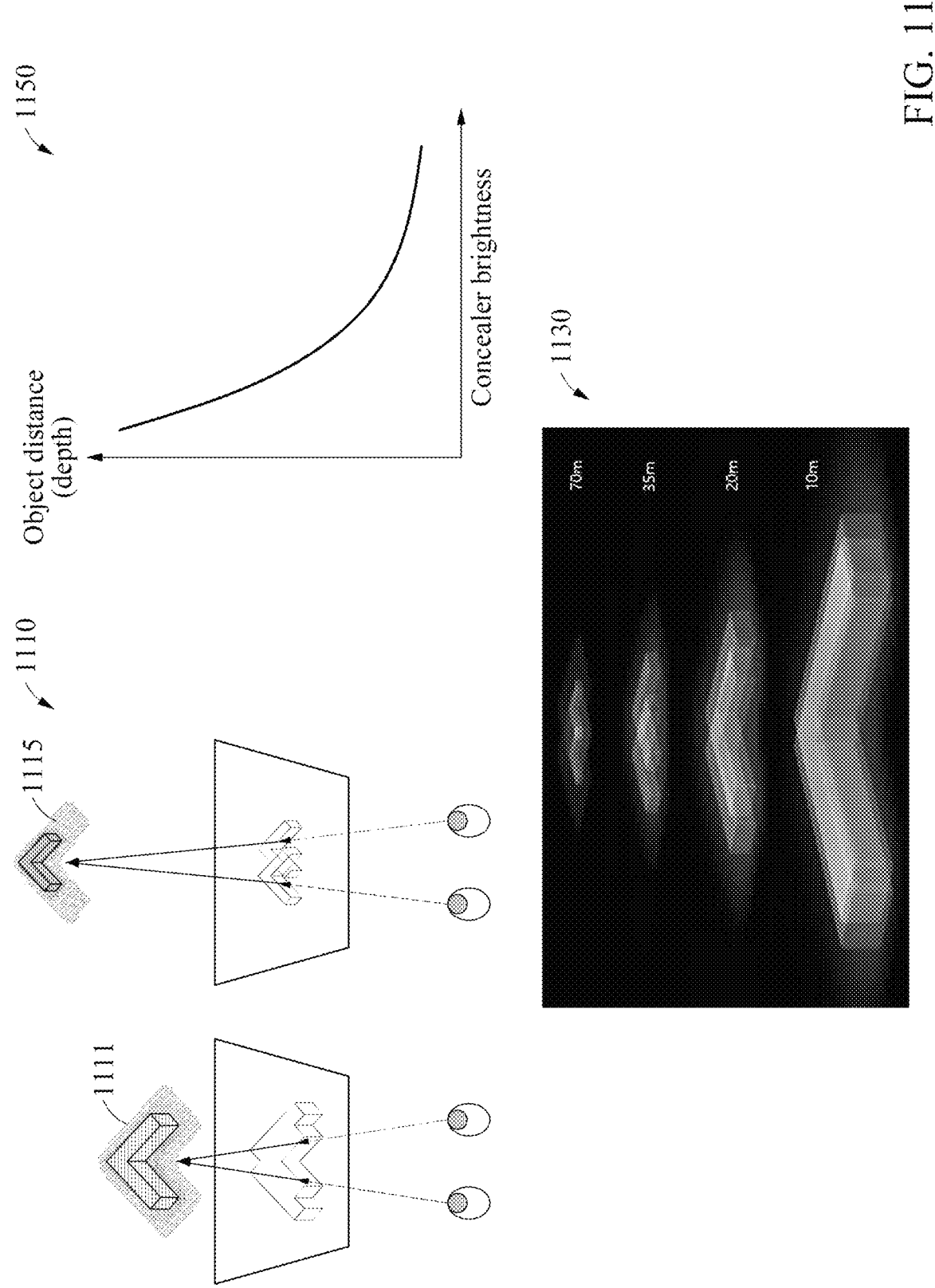
Figure 12:
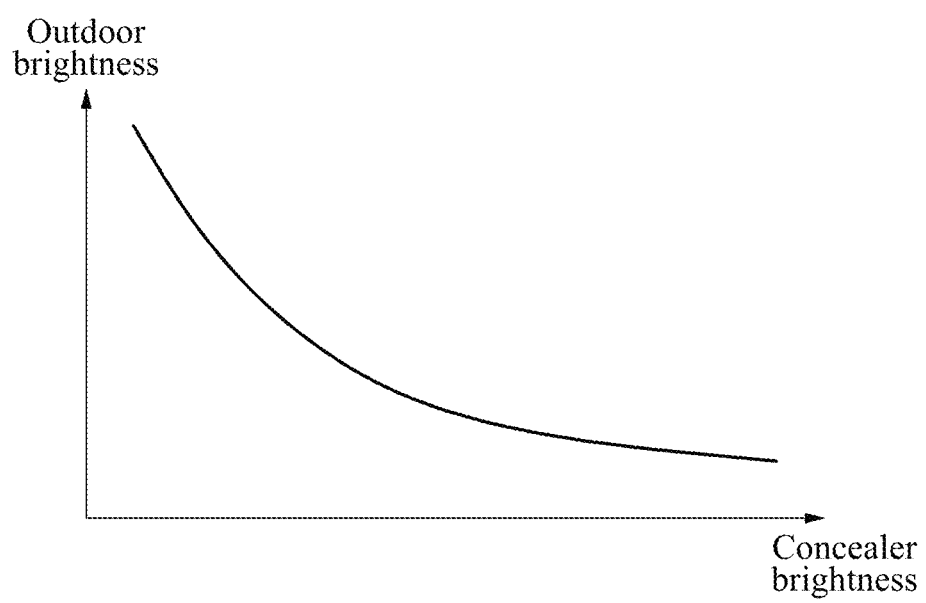

FIGS. 10 through 12 illustrate examples of adjusting at least one effect element. In the example of FIG. 10, illustrated are graphs 1010 and 1020 illustrating a relationship between a distance between a disparity or position of both eyes of a user and a position of a virtual image of a virtual content object, and an afterimage range of a concealer image, and portions 1030 and 1040 provided to describe the relationship. Hereinafter, the distance between the position of both eyes of the user and the position of the virtual image of the virtual content object will also be referred to as a depth of the position of the virtual image of the virtual content object from the position of the eyes of the user.

In a glassless 3D display method, a distance between a position of both eyes of a user and a virtual image of a virtual content object may be used to determine an afterimage range of a crosstalk. The afterimage range of the crosstalk may not linearly increase with respect to a disparity (or parallax).

However, as illustrated in the graph 1010, the afterimage range may gradually converge to a certain value after rapidly increasing at first, as the distance between the disparity or the position of both eyes of the user and the virtual image of the virtual content object increases.

A correcting apparatus may determine the distance between the position of both eyes of the user and the virtual image of the virtual content object in a same way as applied to an optical field display as shown in the graph 1010, and then render a concealer image by adjusting at least one effect element of the concealer image based on the distance as shown in the graph 1020.

For example, as illustrated in the portion 1030, a distance between a position of both eyes of a user and a virtual image 1031 of a virtual content object may be relatively short, and a distance between the position of both eyes of the user and a virtual image 1033 of the virtual content object may be relatively great.

Referring to the graph 1020, as the distance between the position of both eyes of the user and the virtual image of the virtual content object increases, a range of the crosstalk (e.g., a width of the crosstalk) may be expanded. Conversely, as the distance between the position of both eyes of the user and the virtual image of the virtual content object decreases, the range of the crosstalk may be narrowed.

To remove such visible side effects of the crosstalk, the correcting apparatus may reduce a range of the concealer image as the distance to the virtual image of the virtual content object decreases. For example, as illustrated on a left side of the portion 1040, the correcting apparatus may gradually reduce an afterimage range 1043 of the concealer image corresponding to a size of a virtual image 1041 of the virtual content object, as the distance between the position of both eyes of the user and a position of the virtual image 1041 of the virtual content object decreases to be less than a reference distance.

In addition, to remove such visible side effects of the crosstalk, the correcting apparatus may expand the range of the concealer image as the distance to the virtual image of the virtual content object increases. For example, as illustrated on a right side of the portion 1040, the correcting apparatus may gradually expand an afterimage range 1047 of the concealer image corresponding to a size of a virtual image 1045 of the virtual content object, as the distance between the position of both eyes of the user and a position of the virtual image 1045 of the virtual content object increases to be greater than the reference distance.

In the example of FIG. 11, illustrated are a portion 1110 illustrating a relationship between a size of a virtual content object and a distance between a position of both eyes of a user and a position of a virtual image of the virtual content object, a portion 1130 illustrating a size of the virtual image of the virtual content object by each distance, and a graph 1130 illustrating a relationship between the distance and brightness of the virtual content object.

Referring to the portion 1110, as a distance between the position of both eyes of the user and a position of a virtual image 1111 of the virtual content object decreases, the size of the virtual image 1111 of the virtual content object may increase. Conversely, as the distance between the position of both eyes of the user and a position of a virtual image 1115 of the virtual content object increases, the size of the virtual image 1115 of the virtual content object may decrease.

The size of a virtual image of the virtual content object by each distance may be as illustrated in the portion 1130. Referring to the portion 1130, as the size of the virtual image of the virtual content object increases, the size of an area of the virtual image of the virtual content object may also increase and brightness of the virtual image may increase. In such a case, the correcting apparatus may adjust the contrast and brightness of a concealer image corresponding to the virtual image of the virtual content object to be brighter in order to reduce disharmony or incompatibility with an surrounding environment. For example, referring to the graph 1150, as the distance between the position of both eyes of the user and the position of the virtual image of the virtual content object decreases to be less than a reference distance, the correcting apparatus may adjust the contrast and brightness of the concealer image to be gradually brighter.

In addition, referring to the portion 1130, as the size of the virtual image of the virtual content object decreases, the size of the area of the virtual image of the virtual content object may also decrease and the brightness of the virtual image may decrease. In such a case, the correcting apparatus may adjust the contrast and brightness of the concealer image corresponding to the virtual image of the virtual content object to be darker in order to reduce the disharmony or incompatibility with the surrounding environment. For example, referring to the graph 1150, as the distance between the position of both eyes of the user and the position of the virtual image of the virtual content object increases to be greater than the reference distance, the correcting apparatus may adjust the contrast and brightness of the concealer image to be gradually darker.

In the example of FIG. 12, illustrated is a graph indicating a relationship between illumination of a surrounding environment and brightness of a concealer image.

A light source in an actual surrounding environment may greatly affect a crosstalk. For example, as brightness of a virtual content object visualized by an HUD increases at night, a stronger crosstalk may occur. In contrast, when the brightness of the virtual content object decreases, a weaker crosstalk may occur.

Referring to the graph illustrated in FIG. 12, when the brightness of the virtual content object is relatively high in the nighttime when the illumination of a surrounding environment is low, a crosstalk may be more intensified. In response to this, a correcting apparatus may increase the brightness of a concealer image in the nighttime. In contrast, the correcting apparatus may decrease the brightness of the concealer image in the daytime when the illumination of the surrounding environment is high.

For example, as the illumination of the surrounding environment increases to be greater than a reference illumination, the correcting apparatus may adjust the brightness of the concealer image to be gradually darker. In contrast, as the illumination of the surrounding environment decreases to be less than the reference illumination, the correcting apparatus may adjust the brightness of the concealer image to be gradually brighter. By doing such, the correcting apparatus of one or more embodiments may weaken a crosstalk.

Figure 13:
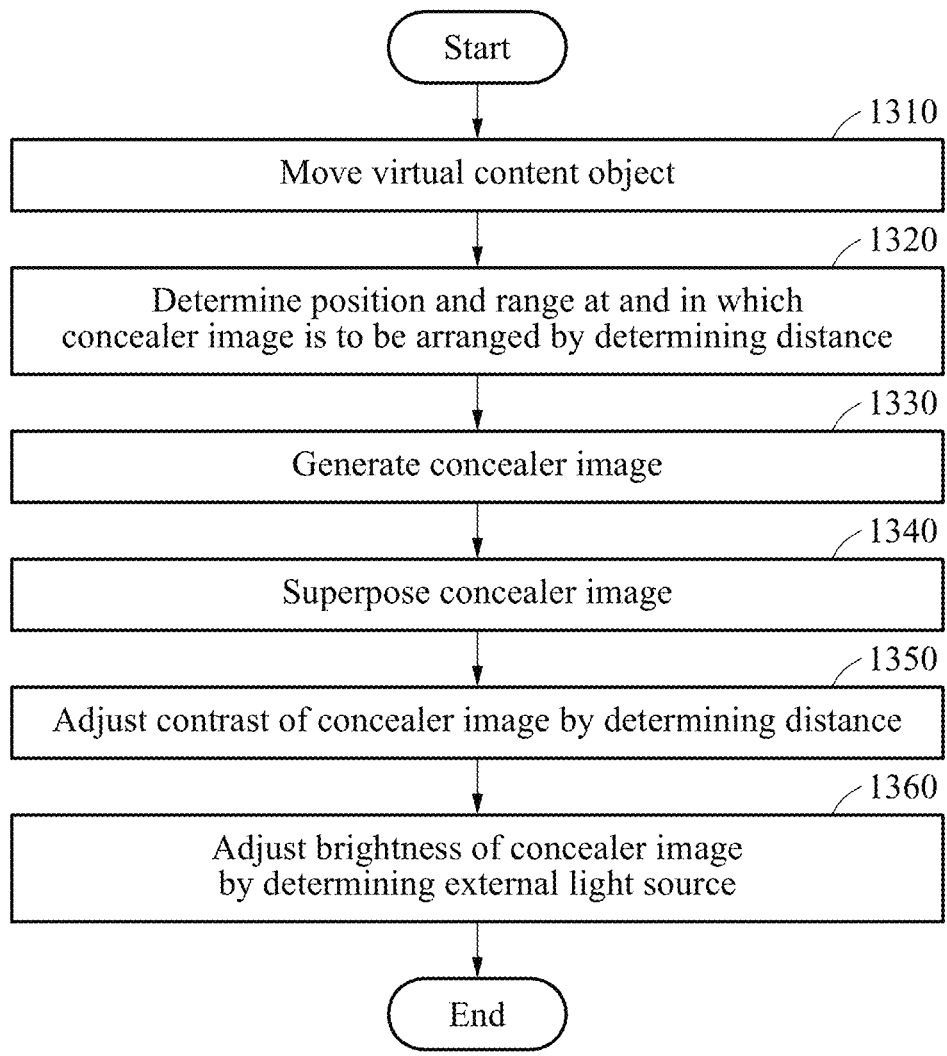
FIG. 13 illustrates an example of a crosstalk correcting method.

FIG. 13 illustrates an example of a crosstalk correcting method. Referring to FIG. 13, a correcting apparatus may correct a crosstalk by performing operations 1310 through 1360 to be described hereinafter.

In operation 1310, the correcting apparatus may detect a movement of a virtual content object.

In operation 1320, the correcting apparatus may determine a position and a range at and in which a concealer image is to be arranged by determining a distance moved in operation 1310. The position and the range at and in which the concealer image is to be arranged may correspond to a region in which a crosstalk is to occur.

In operation 1330, the correcting apparatus may generate the concealer image.

In operation 1340, the correcting apparatus may superpose the concealer image generated in operation 1330 in the region in which the crosstalk is to occur, and/or at the position and in the range of the concealer image determined in operation 1320.

In operation 1350, the correcting apparatus may adjust contrast of the concealer image superposed in the region in which the crosstalk is to occur by determining a distance between a position of a virtual image of the virtual content object and a position of both eyes of a user.

In operation 1360, the correcting apparatus may adjust brightness of the concealer image of which the contrast is adjusted in operation 1350 by determining an external light source.

Depending on examples, operation 1350 and/or operation 1360 may be performed by being included in operation 1330 of generating the concealer image, or be performed by adjusting the concealer image superposed in the region in which the crosstalk is to occur after the generating of the concealer image is generated as described above with reference to FIG. 13.

The crosstalk correcting apparatuses, correcting apparatuses, sensors, processors, memories, displays, communication interfaces, content visualizing systems, HUDs, image generators, fold mirrors, concave mirrors, correcting apparatus 300, sensor 310, processor 330, memory 350, display 370, communication interface 390, content visualizing system 400, correcting apparatus 410, sensor 411, processor 412, HUD 413, image generator 414, fold mirror 415, concave mirror 416, display 930, and other apparatuses, devices, units, modules, and components described herein with respect to FIGS. 1-13 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method with crosstalk correction, comprising:
   determining a region in which a crosstalk is to occur based on a three-dimensional (3D) position relationship between a position of eyes of a user and a position of a virtual image of a virtual content object;
   generating a concealer image for correcting the region in which the crosstalk is to occur based on the determined region and the virtual content object; and
   correcting the crosstalk by combining the virtual content object and the generated concealer image.

2. The method of claim 1, wherein the generating of the concealer image comprises:
   adjusting one or more effect elements including any one or any combination of an afterimage range, a contrast, and a brightness of the concealer image.

3. The method of claim 2, wherein the afterimage range of the concealer image corresponds to a width of the concealer image.

4. The method of claim 2, wherein the adjusting of the one or more effect elements comprises any one or more of:
   adjusting the afterimage range of the concealer image, corresponding to a size of the virtual image of the virtual content object, based on the 3D position relationship;
   adjusting either one or both of the contrast and the brightness of the concealer image based on the 3D position relationship; and
   adjusting the brightness of the concealer image based on an illumination of a surrounding environment.

5. The method of claim 4, wherein the adjusting of the afterimage range of the concealer image comprises:
   gradually expanding the afterimage range of the concealer image corresponding to the size of the virtual image of the virtual content object, as a distance between the position of the eyes of the user and the position of the virtual image increases while greater than a reference distance; and
   gradually reducing the afterimage range of the concealer image corresponding to the size of the virtual image of the virtual content object, as the distance between the position of the eyes of the user and the position of the virtual image decreases while greater than the reference distance.

6. The method of claim 4, wherein the adjusting of either one or both of the contrast and the brightness of the concealer image comprises:
   gradually adjusting either one or both of the contrast and the brightness of the concealer image to be darker, as a distance between the position of the eyes of the user and the position of the virtual image increases while greater than a reference distance; and
   gradually adjusting either one or both of the contrast and the brightness of the concealer image to be brighter, as the distance between the position of the eyes of the user and the position of the virtual image decreases while greater than the reference distance.

7. The method of claim 4, wherein the adjusting of the brightness of the concealer image comprises:
   gradually adjusting the brightness of the concealer image to be darker, as the illumination increases while greater than reference illumination; and
   gradually adjusting the brightness of the concealer image to be brighter, as the illumination decreases while greater than the reference illumination.

8. The method of claim 1, wherein the generating of the concealer image comprises:
   generating the concealer image by blurring the virtual content object according to a shape of the virtual content object.

9. The method of claim 1, wherein the generating of the concealer image comprises:
   generating a blurred image by blurring the virtual content object; and
   generating the concealer image by adjusting one or more effect elements including any one or any combination of an afterimage range, a contrast, and a brightness corresponding to the blurred image.

10. The method of claim 9, wherein the generating of the blurred image comprises:
    generating the blurred image according to a shape expanded from the virtual content object based on the 3D position relationship.

11. The method of claim 9, wherein the generating of the blurred image comprises:
    generating a first blurred image corresponding to a left eye of the eyes of the user and a second blurred image corresponding to a right eye of the eyes of the user, based on a shape of the virtual content object; and generating the blurred image by combining the first blurred image and the second blurred image.

12. The method of claim 11, wherein the generating of the blurred image by combining the first blurred image and the second blurred image comprises:

separating the first blurred image and the second blurred image from each other by a distance that is based on a disparity of the eyes of the user; and combining the first blurred image and the second blurred image while maintaining the distance.

13. The method of claim 12, wherein the combining of the first blurred image and the second blurred image while maintaining the distance comprises:

generating the blurred image by interpolating the first blurred image and the second blurred image that are separated from each other.

14. The method of claim 1, wherein the correcting of the crosstalk comprises:

arranging the concealer image in a 3D space including the virtual content object;

generating a left image and a right image by rendering the virtual content object combined with the concealer image; and projecting the left image and the right image.

15. The method of claim 1, wherein the correcting of the crosstalk comprises:

generating a left image and a right image by rendering the virtual content object; and projecting the left image, the right image, and the concealer image.

16. The method of claim 1, wherein the determining of the region in which the crosstalk is to occur comprises:

determining the region in which the crosstalk is to occur based on a disparity between the eyes of the user and the 3D position relationship.

17. The method of claim 1, wherein the determining of the region in which the crosstalk is to occur comprises:

determining the region in which the crosstalk is to occur by adjusting an afterimage range of the region in which the crosstalk is to occur based on a disparity between the eyes of the user and the 3D position relationship.

18. The method of claim 1, further comprising:

detecting a movement of the position of the virtual content object, wherein the determining of the region in which the crosstalk is to occur comprises:

determining the region in which the crosstalk is to occur based on either one or both of the 3D position relationship and a disparity between the eyes of the user that is changed based on the detected movement of the position.

19. The method of claim 1, wherein the region in which the crosstalk is to occur corresponds to a position and a range at and in which the concealer image is to be arranged.

20. A non-transitory computer-readable storage medium storing instructions that, when executed by a processor, configure the processor to perform the method of claim 1.

21. An apparatus with crosstalk correction, comprising:

a sensor configured to sense a position of eyes of a user; and a processor configured to determine a region in which a crosstalk is to occur based on a three-dimensional (3D) position relationship between the position of the eyes of the user and a position of a virtual image of a virtual content object, generate a concealer image for correcting the region in which the crosstalk is to occur based on the determined region and the virtual content object, and correct the crosstalk by combining the virtual content object and the generated concealer image.

22. The apparatus of claim 21, wherein, for the generating of the concealer image, the processor is configured to:

adjust one or more effect elements including any one or any combination of an afterimage range, a contrast, and a brightness of the concealer image.

23. The apparatus of claim 22, wherein, for the adjusting of the one or more effect elements, the processor is configured to perform any one or more of:

adjusting the afterimage range of the concealer image, corresponding to a size of the virtual image of the virtual content object, based on the 3D position relationship;

adjusting either one or both of the contrast and the brightness of the concealer image based on the 3D position relationship; and adjusting the brightness of the concealer image based on an illumination of a surrounding environment.

24. The apparatus of claim 23, wherein, for the adjusting of the afterimage range of the concealer image, the processor is configured to:

gradually expand the afterimage range of the concealer image corresponding to the size of the virtual image of the virtual content object, as a distance between the position of the eyes of the user and the position of the virtual image increases while greater than a reference distance; and gradually reduce the afterimage range of the concealer image corresponding to the size of the virtual image of the virtual content object, as the distance between the position of the eyes of the user and the position of the virtual image decreases while greater than the reference distance.

25. The apparatus of claim 24, wherein, for the adjusting of either one or both of the contrast and the brightness of the concealer image, the processor is configured to:

gradually adjust either one or both of the contrast and the brightness of the concealer image to be darker, as the distance between the position of the eyes of the user and the position of the virtual image increases while greater than the reference distance; and gradually adjust either one or both of the contrast and the brightness of the concealer image to be brighter, as the distance between the position of the eyes of the user and the position of the virtual image decreases while greater than the reference distance.

26. The apparatus of claim 23, wherein, for the adjusting of the brightness of the concealer image, the processor is configured to:

gradually adjust the brightness of the concealer image to be darker, as the illumination increases while greater than reference illumination; and gradually adjust the brightness of the concealer image to be brighter, as the illumination decreases while greater than the reference illumination.

27. The apparatus of claim 21, wherein, for the generating of the concealer image, the processor is configured to:

generate the concealer image by blurring the virtual content object according to a shape of the virtual content object.

28. The apparatus of claim 21, wherein, for the generating of the concealer image, the processor is configured to:
generate a blurred image by blurring the virtual content object; and
generate the concealer image by adjusting one or more effect elements including any one or any combination of an afterimage range, a contrast, and a brightness corresponding to the blurred image.

29. The apparatus of claim 28, wherein, for the generating of the blurred image, the processor is configured to:
generate the blurred image according to a shape expanded from the virtual content object based on the 3D position relationship.

30. The apparatus of claim 28, wherein, for the generating of the blurred image, the processor is configured to:
generate a first blurred image corresponding to a left eye of the eyes of the user and a second blurred image corresponding to a right eye of the eyes of the user, based on a shape of the virtual content object; and
generate the blurred image by combining the first blurred image and the second blurred image.

31. The apparatus of claim 30, wherein, for the generating of the blurred image by combining the first blurred image and the second blurred image, the processor is configured to:
separate the first blurred image and the second blurred image from each other by a distance that is based on a disparity between the eyes of the user; and
combine the first blurred image and the second blurred image while maintaining the distance.

32. The apparatus of claim 31, wherein, for the combining of the first blurred image and the second blurred image while maintaining the distance, the processor is configured to:
generate the blurred image by interpolating the first blurred image and the second blurred image that are separated from each other.

33. The apparatus of claim 21, wherein, for the correcting of the crosstalk, the processor is configured to:
arrange the concealer image in a 3D space including the virtual content object;
generate a left image and a right image by rendering the virtual content object combined with the concealer image; and
project the left image and the right image.

34. The apparatus of claim 21, wherein, for the correcting of the crosstalk, the processor is configured to:
generate a left image and a right image by rendering the virtual content object; and
project the left image, the right image, and the concealer image.

35. The apparatus of claim 21, wherein, for the determining of the region in which the crosstalk is to occur, the processor is configured to:
determine the region in which the crosstalk is to occur based on a disparity between the eyes of the user and the 3D position relationship.

36. The apparatus of claim 21, wherein, for the determining of the region in which the crosstalk is to occur, the processor is configured to:
determine the region in which the crosstalk is to occur by adjusting an afterimage range of the region in which the crosstalk is to occur based on a disparity between the eyes of the user and the 3D position relationship.

37. The apparatus of claim 21, wherein the processor is configured to:
detect a movement of the position of the virtual content object; and
for the determining of the region in which the crosstalk is to occur, determine the region in which the crosstalk is to occur based on either one or both of the 3D position relationship and a disparity between the eyes of the user that is changed based on the detected movement of the position.

38. The apparatus of claim 21, wherein the region in which the crosstalk is to occur corresponds to a position and a range at and in which the concealer image is to be arranged.

39. The apparatus of claim 21, wherein the apparatus is a content visualizing device comprising a display configured to visualize the virtual content object combined with the generated concealer image by projecting onto a projection plane.

40. The apparatus of claim 21, wherein the apparatus is an augmented reality (AR) glass device comprising a transparent display configured to visualize the virtual content object combined with the generated concealer image.

41. The apparatus of claim 21, wherein
the apparatus is vehicle comprising a head-up display (HUD) configured to visualize, on a projection plane, the virtual content object combined with the generated concealer image to be provided to the user, and
the sensor is configured to sense a position of the vehicle.

42. A content visualizing device comprising:
a processor configured to
determine a region in which a crosstalk is to occur based on a three-dimensional (3D) position relationship between a position of eyes of a user and a position of a virtual image of a virtual content object,
generate a concealer image for correcting the region in which the crosstalk is to occur based on the determined region and the virtual content object, and
correct the crosstalk by combining the virtual content object and the generated concealer image; and
a display configured to visualize the virtual content object combined with the generated concealer image by projecting onto a projection plane.

43. An augmented reality (AR) glass device comprising:
a processor configured to
determine a region in which a crosstalk is to occur based on a three-dimensional (3D) position relationship between a position of eyes of a user and a position of a virtual image of a virtual content object,
generate a concealer image for correcting the region in which the crosstalk is to occur based on the determined region and the virtual content object, and
correct the crosstalk by combining the virtual content object and the generated concealer image; and
a transparent display configured to visualize the virtual content object combined with the generated concealer image.

44. A vehicle comprising:
a sensor configured to sense a position of the vehicle;
a processor configured to
determine the virtual content object based on the position of the vehicle, determine a region in which a crosstalk is to occur based on a three-dimensional (3D) position relationship between a position of the eyes of a user and a position of a virtual image of a virtual content object,
generate a concealer image for correcting the region in which the crosstalk is to occur based on the determined region and the virtual content object, and
correct the crosstalk by combining the virtual content object and the generated concealer image; and a head-up display (HUD) configured to visualize, on a projection plane, the virtual content object combined with the generated concealer image to be provided to the user.

45. A crosstalk correcting method comprising:
generating a concealer image including an area around a virtual image of a virtual object, based on a shape of the virtual image and a distance between a position of eyes of a user and a position of the virtual image in a three-dimensional (3D) virtual space; and
rendering a combination of the virtual object and the concealer image in the 3D virtual space.

46. The method of claim 45, wherein the generating of the concealer image comprises increasing a width of the concealer image in response to an increase in the distance.

47. The method of claim 45, wherein the generating of the concealer image comprises:
in response to the distance being less than a threshold, adjusting a width of the concealer image a first amount in response to a change in the distance; and
in response to the distance being greater than or equal to the threshold, adjusting the width of the concealer image a second amount in response to the change in the distance.

48. The method of claim 47, wherein the first amount is greater than the second amount.

49. The method of claim 45, wherein the generating of the concealer image comprises decreasing a brightness of the concealer image in response to an increase in the distance.

50. The method of claim 45, wherein the generating of the concealer image comprises:
generating a left side image and a right side image, each corresponding to a shape of the virtual object; and
generating the concealer image by combining the left side image and the right side image.

51. The method of claim 50, wherein the combining of the left side image and the right side image comprises interpolating the left side image and the right side image such that the concealer image includes an area of the left side image, an area of the right side image, and an area between the left side image and the right side image.

52. A crosstalk correcting method comprising:
generating a concealer image including an area around a virtual image of a virtual object;
adjusting either one or both of a width and a brightness of the concealer image, in response to a change in a distance between a position of eyes of a user and a position of the virtual image in a three-dimensional (3D) virtual space; and
rendering a combination of the virtual object and the concealer image in the 3D virtual space.

* * * * *